(12) United States Patent
Kim et al.

(10) Patent No.: US 8,204,012 B2
(45) Date of Patent: Jun. 19, 2012

(54) SYSTEM AND METHOD FOR USING FREQUENCY RESOURCE IN COMMUNICATION SYSTEM

(75) Inventors: Ki-Tae Kim, Seoul (KR); Seong-Keun Oh, Suwon-si (KR)

(73) Assignees: Samsung Electronics Co., Ltd, Suwon-si (KR); Seoul National University Industry Foundation, Seoul (KR)

(*) Notice: Subject to any disclaimer, the term of this patent is extended or adjusted under 35 U.S.C. 154(b) by 910 days.

(21) Appl. No.: 12/188,159

(22) Filed: Aug. 7, 2008

(65) Prior Publication Data

US 2009/0040978 A1 Feb. 12, 2009

(30) Foreign Application Priority Data

Aug. 9, 2007 (KR) .............................. 2007-0080314
Jan. 10, 2008 (KR) .............................. 2008-0003185

(51) Int. Cl.
*H04W 4/00* (2009.01)
*H04J 1/00* (2006.01)

(52) U.S. Cl. ......................... 370/329; 370/343; 370/480
(58) Field of Classification Search ....................... None
See application file for complete search history.

(56) References Cited

U.S. PATENT DOCUMENTS

| 6,907,246 | B2 * | 6/2005 | Xu et al. ........................ 455/447 |
| 7,764,662 | B2 * | 7/2010 | Oh et al. ........................ 370/343 |
| 2002/0061006 | A1 * | 5/2002 | Soliman ....................... 370/342 |
| 2006/0140217 | A1 * | 6/2006 | Jung et al. .................... 370/468 |
| 2006/0205412 | A1 * | 9/2006 | Oh et al. ...................... 455/450 |
| 2006/0250935 | A1 * | 11/2006 | Hamamoto et al. .......... 370/203 |

* cited by examiner

*Primary Examiner* — Nittaya Juntima
(74) *Attorney, Agent, or Firm* — Jefferson IP Law, LLP

(57) ABSTRACT

A system for using frequency resources in a multi-cell communication system is provided. The system includes cells included in a multi-cell communication system, each cell being controlled to use frequency resources based on a preset segment sequence, wherein available frequency bands which can be used by the respective cells are equal to each other, the available frequency band is divided into "A" number of segments, each segment is divided into "B" number of partial bands, each partial band is divided into "C" number of channels, and the segment sequence comprises an order in which the "A" number of segments are used.

18 Claims, 21 Drawing Sheets

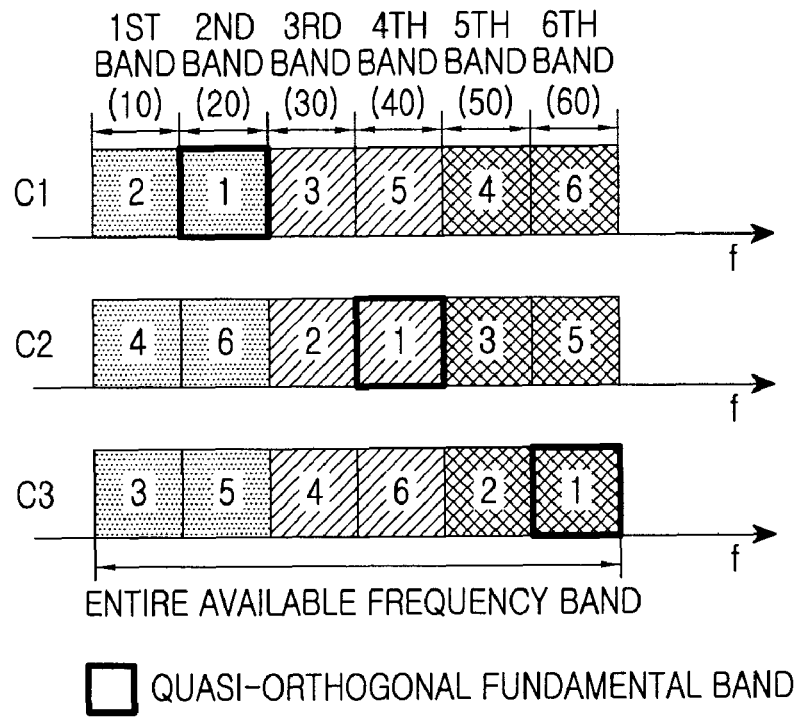
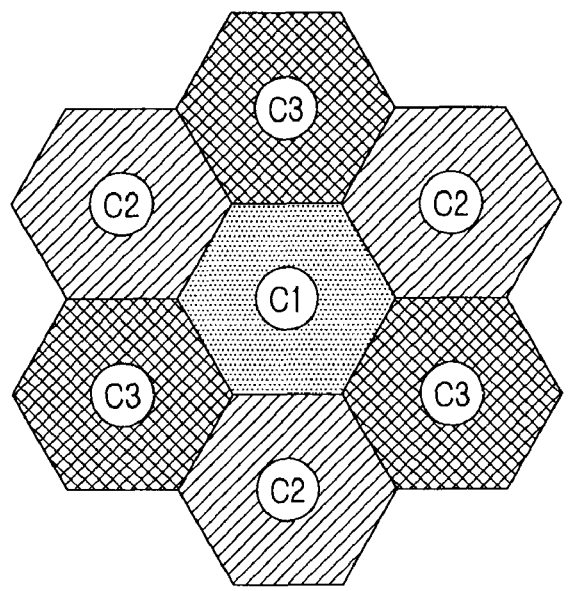
FIG.14

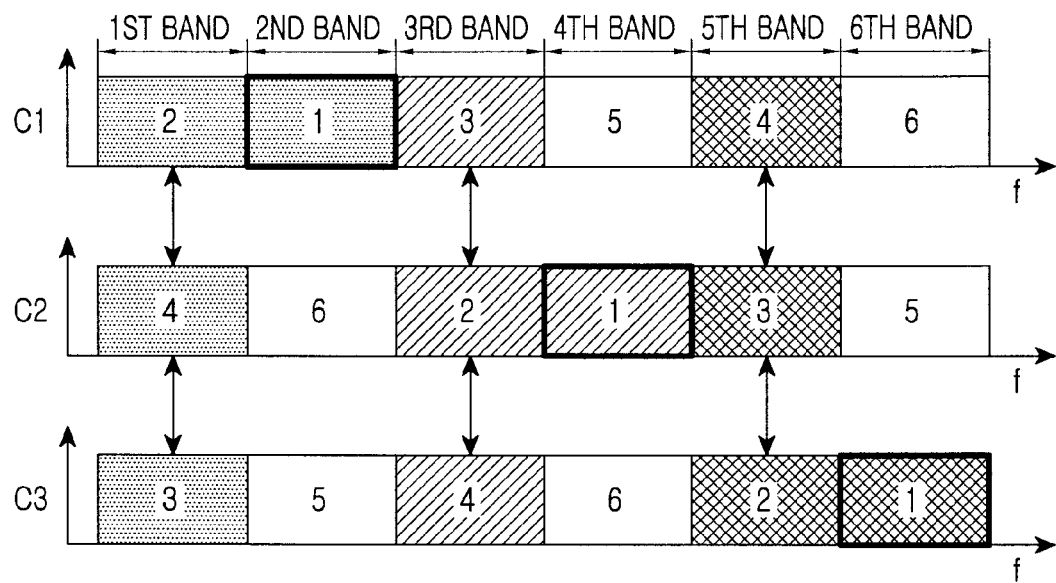
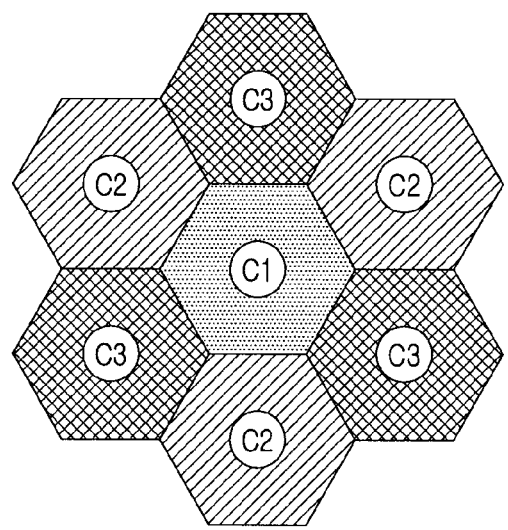
FIG.16

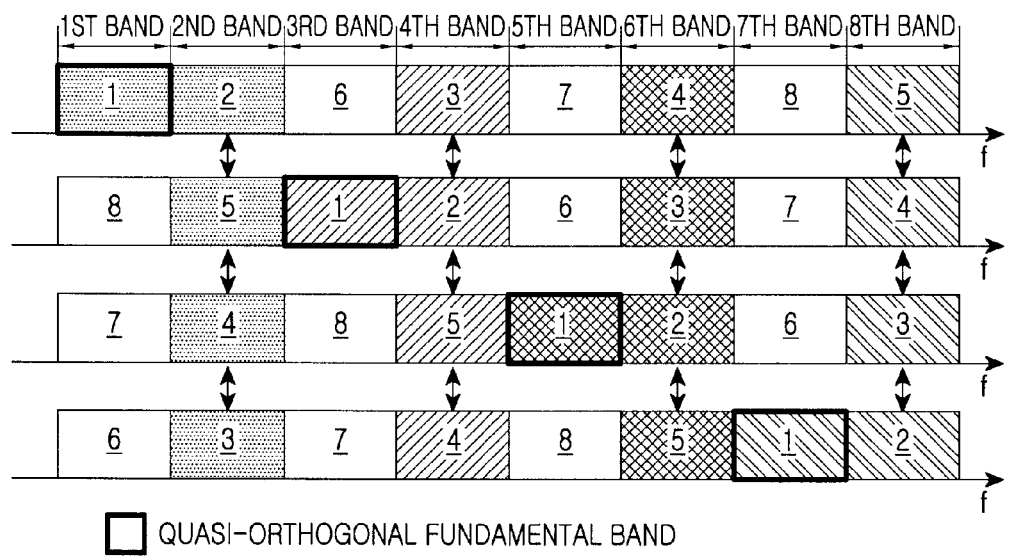
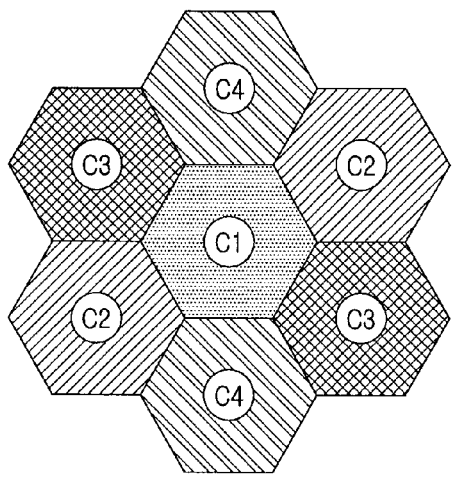
FIG.17

FIG.18C LOADING FACTOR OF 6/6 OR LESS

FIG.18B LOADING FACTOR OF 5/6 OR LESS

FIG.18A LOADING FACTOR OF 4/6 OR LESS

SYSTEM AND METHOD FOR USING FREQUENCY RESOURCE IN COMMUNICATION SYSTEM

PRIORITY

This application claims the benefit under 35 U.S.C. §119(a) of a Korean patent application filed in the Korean Intellectual Property Office on Aug. 9, 2007 and assigned Serial No. 2007-80314, and of a Korean patent application filed on Jan. 10, 2008 and assigned Serial No. 2008-3185, the entire disclosures of both of which are hereby incorporated by reference.

BACKGROUND OF THE INVENTION

1. Field of the Invention

The present invention relates to a system and method in a communication system. More particularly, the present invention relates to a system and method for using frequency resources in a communication system.

2. Description of the Related Art

Communication systems are conventionally constructed in the form of a multi-cell communication system including multiple cells in order to increase the number of Mobile Stations (MSs) which can be accommodated.

Meanwhile, in a wireless communication environment, a frequency reuse scheme is used to increase the number of channels per unit area with limited frequency resources. The frequency reuse scheme can increase the system capacity, even without a specific change in the multi-cell communication system. However, reusing frequencies produces a problem in terms of interference, such as Inter-Cell Interference (ICI).

Therefore, there is a need for a scheme capable of minimizing interference and increasing resource efficiency in the multi-cell communication system.

SUMMARY OF THE INVENTION

An aspect of the present invention is to address the above-mentioned problems and/or disadvantages and to provide at least the advantages described below. Accordingly, an aspect of the present invention is to provide a system and method for using frequency resources in a communication system.

In accordance with an aspect of the present invention, a system for using frequency resources in a multi-cell communication system is provided. The system includes cells included in a multi-cell communication system, each cell being controlled to use frequency resources based on a preset segment sequence, wherein available frequency bands which can be used by the respective cells are equal to each other, the available frequency band is divided into "A" number of segments, each segment is divided into "B" number of partial bands, each partial band is divided into "C" number of channels, and the segment sequence comprises an order in which the "A" number of segments are used.

In accordance with another aspect of the present invention, a method for using frequency resources in a multi-cell communication system is provided. The method includes using, by each cell included in a multi-cell communication system, frequency resources based on a preset segment sequence, wherein available frequency bands which can be used by the respective cells are equal to each other, the available frequency band is divided into "A" number of segments, each segment is divided into "B" number of partial bands, each partial band is divided into "C" number of channels, and the segment sequence comprises an order in which the "A" number of segments are used.

In accordance with still another aspect of the present invention, a method for using frequency resources in a multi-cell communication system is provided. The method includes dividing an entire available frequency band of each cell, which is included in a multi-cell communication system, into a series of partial bands based on a basic frequency reuse factor, setting a reference frequency loading factor by using the basic frequency reuse factor, defining a quasi-orthogonal fundamental band, which does not cause interference with adjacent cells at the reference frequency loading factor or less, from among the series of partial bands according to each cell, determining an allocation sequence so that the quasi-orthogonal fundamental band is first allocated according to each cell, and allocating the partial bands to each cell according to the allocation sequence upon a service request from a user.

In accordance with still another aspect of the present invention, a system for using frequency resources in a multi-cell communication system is provided. The system including a base station for dividing an entire available frequency band of each cell, which is included in a multi-cell communication system, into a series of partial bands based on a basic frequency reuse factor, for setting a reference frequency loading factor by using the basic frequency reuse factor, for defining a quasi-orthogonal fundamental band, which does not cause interference with adjacent cells at the reference frequency loading factor or less, from among the series of partial bands according to each cell, for determining an allocation sequence so that the quasi-orthogonal fundamental band is first allocated according to each cell, and for allocating the partial bands to each cell according to the allocation sequence upon a service request from a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 14 is a view illustrating a quasi-orthogonal fundamental band according to an exemplary embodiment of the present invention;

FIG. 16 is a view illustrating Inter-Cell Interference (ICI) of a quasi-orthogonal fundamental band and the remaining normal partial bands when a frequency reuse factor has a value of "3" and a reference loading factor has a value of "2/3" according to an exemplary embodiment of the present invention;

FIG. 17 is a view illustrating ICI of a quasi-orthogonal fundamental band and the remaining normal partial bands when a frequency reuse factor has a value of "4" and a reference loading factor has a value of "5/8" according to an exemplary embodiment of the present invention;

Throughout the drawings, like reference numerals will be understood to refer to like parts, components and structures.

DETAILED DESCRIPTION OF EXEMPLARY EMBODIMENTS

Figure 1A:
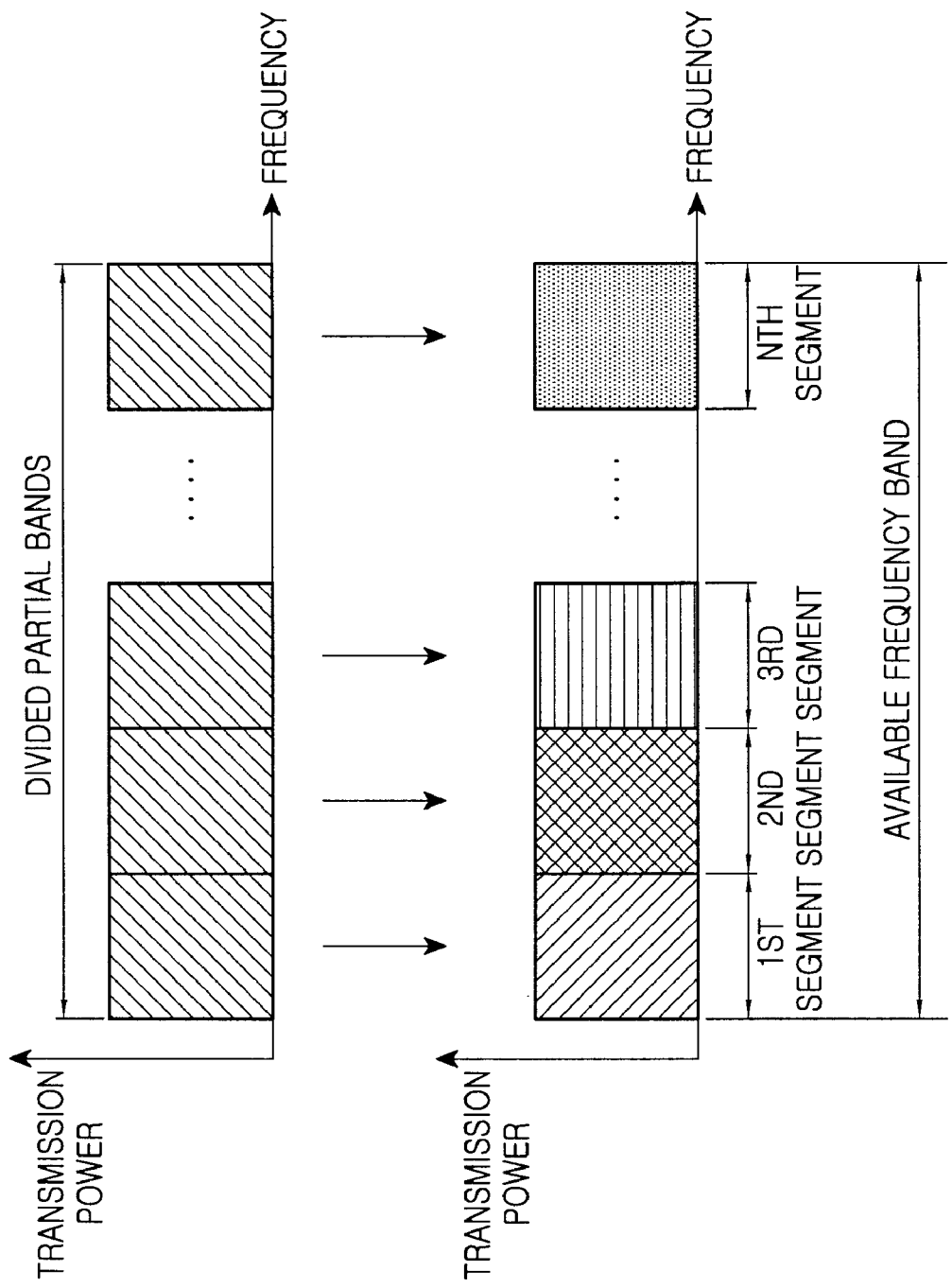
FIG. 1A is a view illustrating a first type of segment use scheme according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention include a system and method for using frequencies in a communication system. More particularly, exemplary embodiments of the present invention include a system and method for using frequency resources according to a frequency resource use sequence preset for each cell in a multi-cell communication system including multiple cells.

First, a frequency reuse factor of "1" is used to maximize the frequency reuse efficiency in a multi-cell communication system. However, as the frequency reuse factor becomes smaller, Inter-Cell Interference (ICI) from adjacent cells increases, so that the frequency reuse factor is restricted from being set to "1" due to the ICI in the multi-cell communication system. Consequently, in order to increase the frequency reuse efficiency, it is necessary to address the ICI problem. Therefore, exemplary embodiments of the present invention propose an Incremental Frequency Reuse (IFR) scheme, for frequency resources that are used according to a frequency resource use sequence preset for each cell included in the multi-cell communication system.

Terms to be used in this description of exemplary embodiments of the present invention are defined as follows.

(1) Available Frequency Band

Each cell included in a multi-cell communication system uses a frequency reuse factor of "1," so that the respective cells can use the same amount of available frequency resources. The available frequency resources which can be used by each cell will be referred to as an "available frequency band."

(2) Channel, Partial Band, and Segment

One segment includes at least one partial band, and one partial band includes at least one channel. The partial band will now be described. First, an available frequency band is divided into a plurality of partial bands, e.g. N number of partial bands, wherein the N number of partial bands may be equal to each other, or may be different. Also, the respective partial bands may include the same number of channels, or may include different numbers of channels. In addition, when one partial band includes a plurality of channels, the channels may be physically consecutive, or may be separated from each other. Also, when one segment includes a plurality of partial bands, the partial bands may be physically consecutive, or may be separated from each other.

Hereinafter, for convenience of description, an exemplary embodiment of the present invention will be described with a case where the sizes of partial bands are the same.

First, a segment use scheme according to an exemplary embodiment of the present invention will now be described with reference to FIGS. 1A and 1B.

FIG. 1A is a view illustrating a first type of segment use scheme according to an exemplary embodiment of the present invention.

In the first type of segment use scheme, segments having the same size are used. That is, referring to FIG. 1A, one segment includes one partial band, and the sizes of N segments, i.e. the sizes of first to Nth segments, are the same.

The first type of segment use scheme according to an exemplary embodiment of the present invention has been described with reference to FIG. 1A, and a second type of segment use scheme according to an exemplary embodiment of the present invention will now be described with reference to FIG. 1B.

Figure 1B:
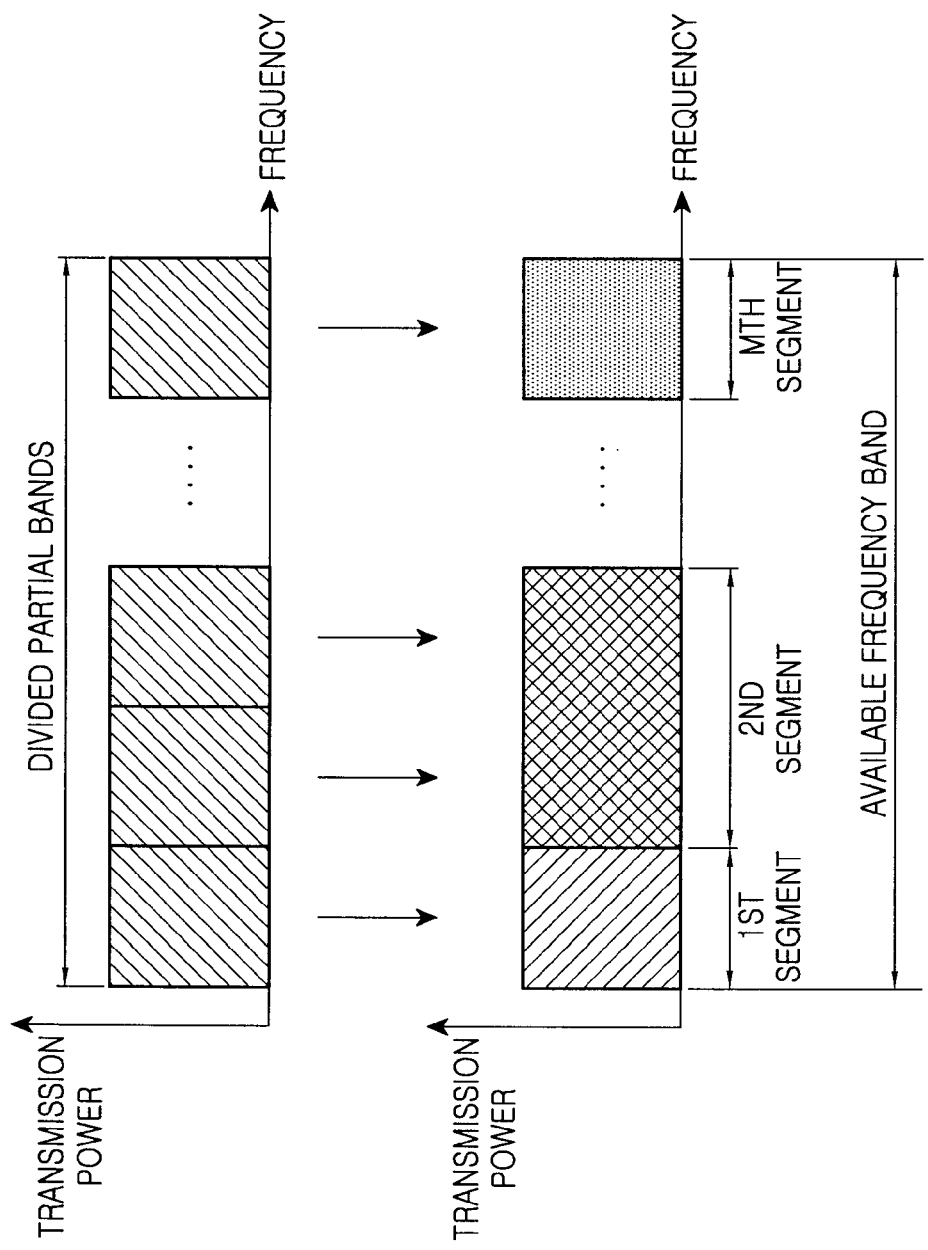
FIG. 1B is a view illustrating a second type of segment use scheme according to an exemplary embodiment of the present invention.

FIG. 1B is a view illustrating the second type of segment use scheme according to an exemplary embodiment of the present invention.

In the second type of segment use scheme, segments having different sizes are used. That is, referring to FIG. 1B, one segment may include one partial band, or may include two partial bands, so that all of the sizes of M segments, i.e. the sizes of first to $M^{th}$ segments, are not equal to each other. For example, a first segment includes one partial band, and a second segment includes two partial bands, from which it can be understood that the sizes of the segments are different.

Figure 1C:
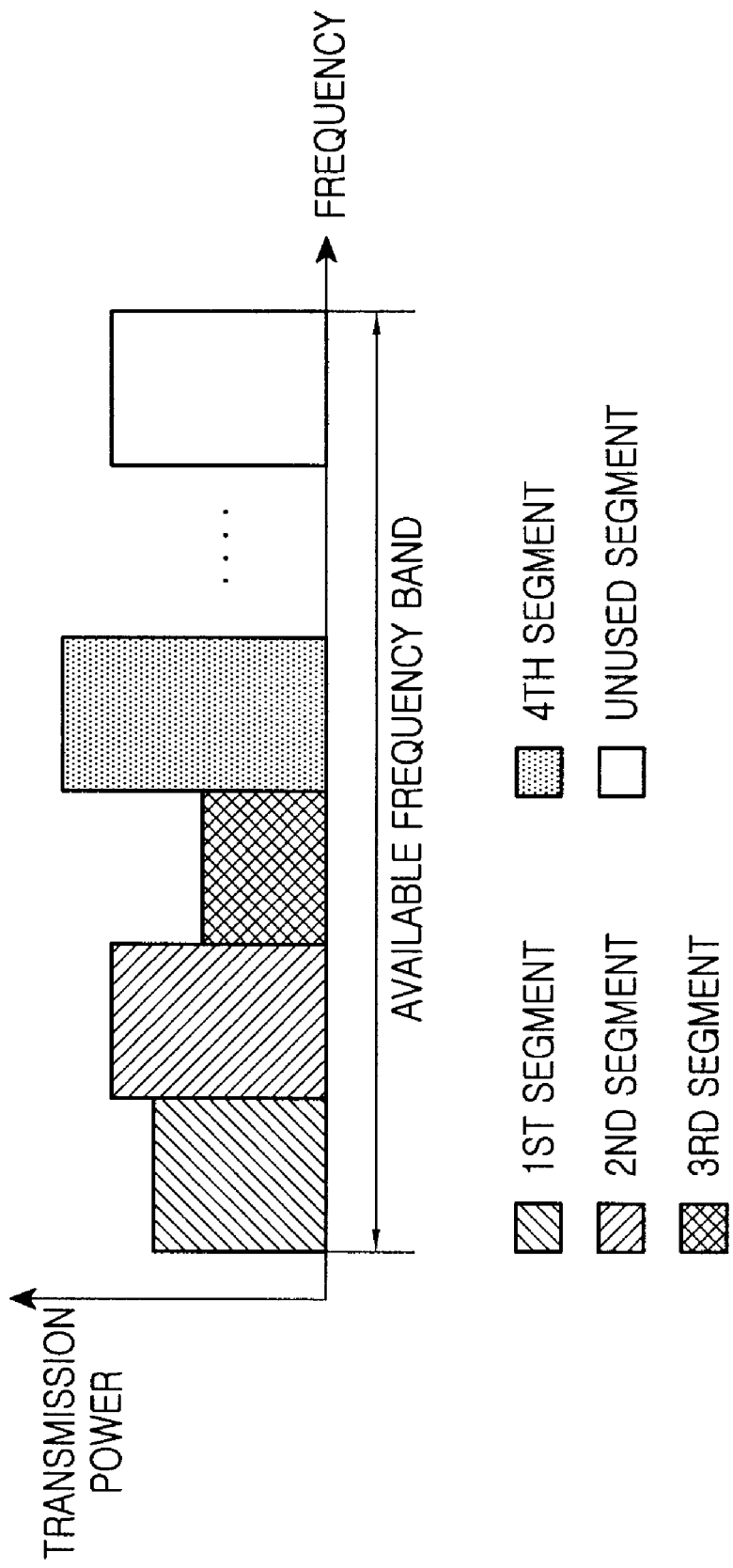
FIG. 1C is a view illustrating a scheme of controlling transmission power in units of segments according to an exemplary embodiment of the present invention.

Meanwhile, transmission power can be controlled in units of either partial bands or segments in each cell of the multi-cell communication system, which is illustrated in FIG. 1C.

FIG. 1C is a view illustrating a scheme of controlling transmission power in units of segments according to an exemplary embodiment of the present invention.

FIG. 1C illustrates an operation of controlling transmission power in units of segments, wherein it can be understood that transmission power levels are different depending on each segment. It is understood that the transmission power levels for the respective segments are the same. In FIG. 1C, first to fourth segments represent segments currently being used, and an unused segment represents a segment currently not being used.

Hereinafter, an operation of using frequency resources according to a frequency resource use sequence according to an exemplary embodiment of the present invention will be described with reference to FIG. 2.

Figure 2:
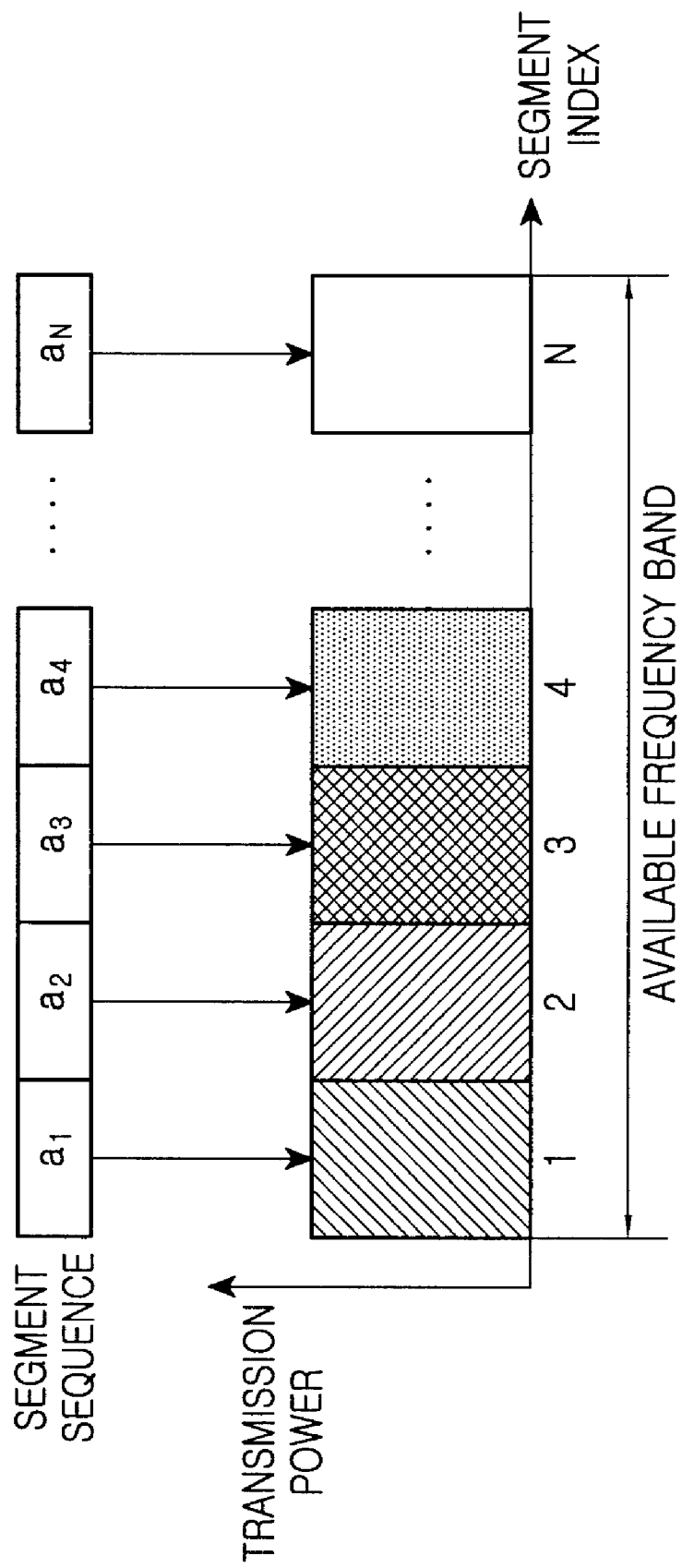
FIG. 2 is a view schematically illustrating an operation of using frequency resources according to a frequency resource use sequence according to an exemplary embodiment of the present invention.

FIG. 2 is a view schematically illustrating an operation of using frequency resources according to a frequency resource use sequence according to an exemplary embodiment of the present invention.

The frequency resource use sequence represents the order in which segments are used. That is, in each cell, segments are used according to a frequency resource use sequence which has been allocated to the corresponding cell in advance. Therefore, the length of a frequency resource use sequence is the same as the number of segments available in each corresponding cell.

Referring to FIG. 2, a frequency resource use sequence is illustrated as a "segment sequence," the segment sequence is $a_1, a_2, a_3, \ldots, a_N$, and segments are allocated according to the segment sequence of $a_1, a_2, a_3, \ldots, a_N$. That is, since the segment sequence is $a_1, a_2, a_3, \ldots, a_N$, Segment 1, Segment 2, Segment 3, ..., Segment N are used in a regular sequence. Since it is assumed that the frequency reuse factor of "1" is used in each cell, the frequency reuse factor becomes "1" when Segment N is finally allocated.

While FIG. 2 illustrates a case where the segments use the same transmission power level, it goes without saying that the segments may use different transmission power levels, as described above.

In the following description, the frequency resource use sequence will be referred to as a "segment sequence." An operation of determining a segment sequence is as follows.

(1) First, a segment sequence represents the order in which segments are used, and a unique segment sequence having the same length as the number of segments available in each cell is used in the corresponding cell.

(2) Segments first-allocated in adjacent cells are orthogonal to each other. Hereinafter, a segment first-allocated in each cell will be referred to as a "base segment."

(3) A segment sequence is determined by taking ICI into consideration. More particularly, a segment sequence is determined by taking into consideration a frequency reuse factor and a sectorization factor in order to minimize ICI.

First, a case of determining segment sequences, by taking a frequency reuse factor into consideration when the types of segment sequences and existing frequency reuse factors used in the respective cells are the same, will now be described with reference to FIG. 3. According to an exemplary embodiment of the present invention, it has been assumed that the frequency reuse factor of "1" is used in each cell of the multi-cell communication system. Therefore, operating each cell as if it uses a frequency reuse factor of "K" in a multi-cell communication system using a frequency reuse factor of "1" will be referred to as "using an existing frequency reuse factor," for convenience of description.

Figure 3:
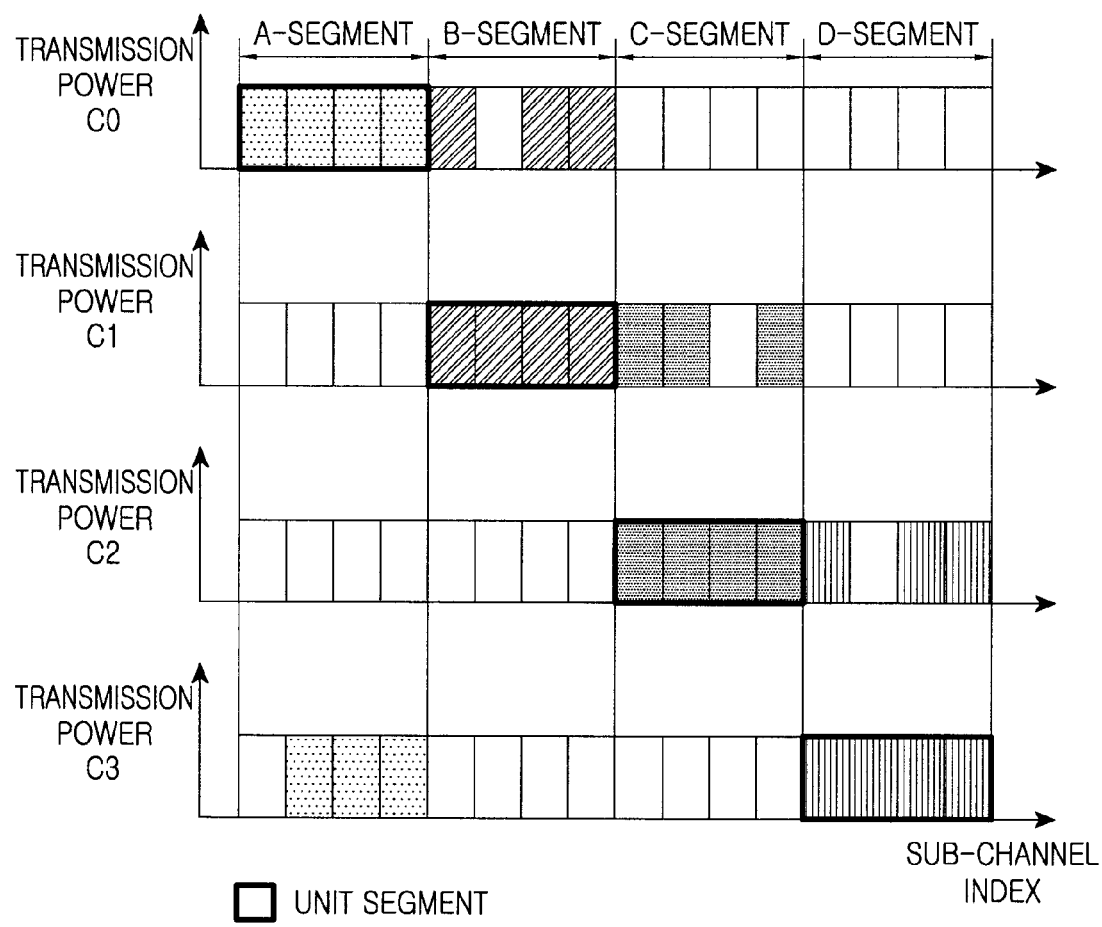
FIG. 3 is a view illustrating segment sequences when the types of segment sequences and existing frequency reuse factors, which are used in the respective cells, are the same according to an exemplary embodiment of the present invention.

FIG. 3 is a view illustrating segment sequences when the types of segment sequences and existing frequency reuse factors, which are used in the respective cells, are the same according to an exemplary embodiment of the present invention.

FIG. 3 illustrates four segment sequences on the assumption that the existing frequency reuse factors have a value of "4." FIG. 3 illustrates segment sequences allocated to the respective cells when a multi-cell communication system includes four cells, i.e. cell C0, cell C1, cell C2, and cell C3, as an example. A segment sequence allocated to cell C0 is entitled segment sequence C0, a segment sequence allocated to cell C1 is entitled segment sequence C1, a segment sequence allocated to cell C2 is entitled segment sequence C2, and a segment sequence allocated to cell C3 is entitled segment sequence C3. The segment sequence C0, the segment sequence C1, the segment sequence C2, and the segment sequence C3 are as follows.

Segment Sequence C0: Segment A→Segment B→Segment C→Segment D

Segment Sequence C1: Segment B→Segment C→Segment D→Segment A

Segment Sequence C2: Segment C→Segment D→Segment A→Segment B

Segment Sequence C3: Segment D→Segment A→Segment B→Segment C

Second, a case of determining segment sequences, by taking a sectorization factor into consideration when the types of segment sequences and sectorization factors used in the respective cells are the same, will now be described with reference to FIG. 4.

Figure 4:
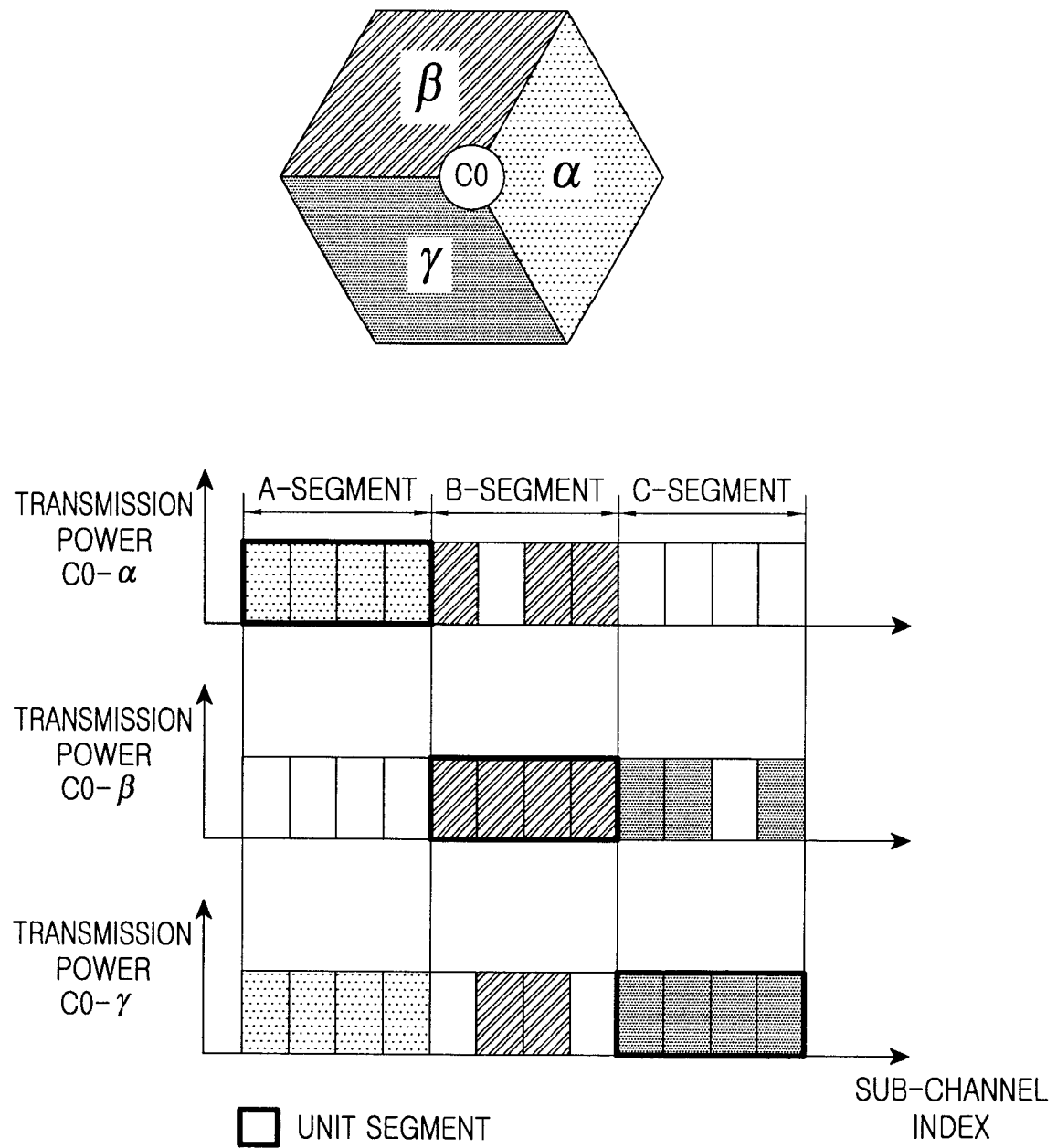
FIG. 4 is a view illustrating segment sequences when the types of segment sequences and sectorization factors, which are used in the respective cells, are the same according to an exemplary embodiment of the present invention.

FIG. 4 is a view illustrating segment sequences when the types of segment sequences and sectorization factors, which are used in the respective cells, are the same according to an exemplary embodiment of the present invention.

FIG. 4 illustrates three segment sequences on the assumption that the existing frequency reuse factors have a value of "3." More particularly, FIG. 4 illustrates segment sequences allocated to the respective sectors when cell C0 in a multi-cell communication system includes three sectors, i.e. sector α, sector β, and sector γ, as an example. A segment sequence allocated to sector α of cell C0 is entitled segment sequence C0-α, a segment sequence allocated to sector β of cell C0 is entitled segment sequence C0-β, and a segment sequence allocated to sector γ of cell C0 is entitled segment sequence C0-γ. The segment sequence C0-α, the segment sequence C0-β, and the segment sequence C0-γ are as follows.

Segment Sequence C0-α: Segment A→Segment B→Segment C

Segment Sequence C0-β: Segment B→Segment C→Segment A

Segment Sequence C0-γ: Segment C→Segment A→Segment B

Hereinafter, the IFR scheme proposed by an exemplary embodiment of the present invention will be described with respect to the examples where an existing frequency reuse factor of "3," an existing frequency reuse factor of "4," and an existing frequency reuse factor of "7" are used.

Figure 5:
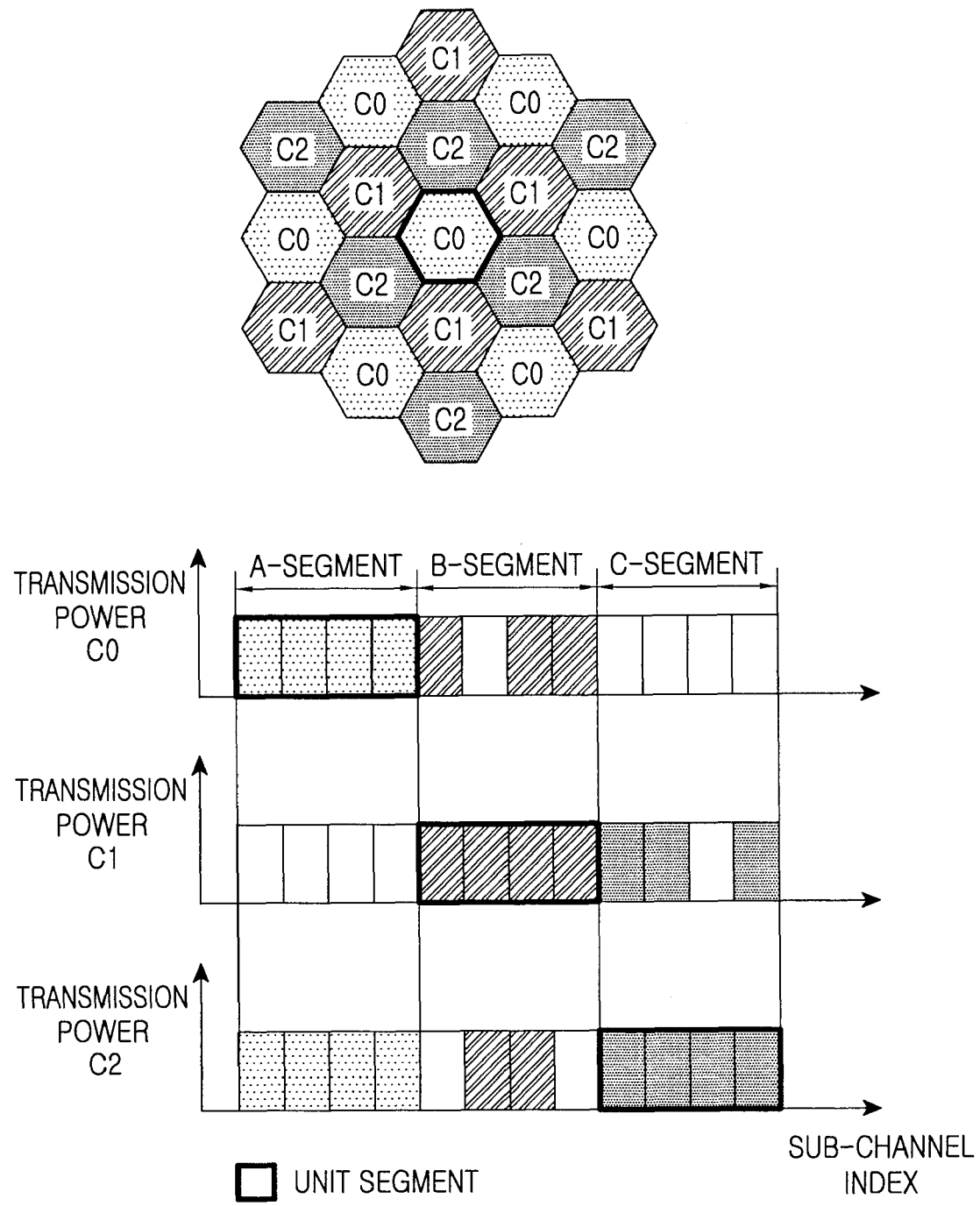
FIG. 5 is a view illustrating an Incremental Frequency Reuse (IFR) scheme when an existing frequency reuse factor of "3," the first type of segment use scheme, and an omni-directional cell structure are used according to an exemplary embodiment of the present invention.

FIG. 5 is a view illustrating an IFR scheme when an existing frequency reuse factor of "3," the first type of segment use scheme, and an omni-directional cell structure are used according to an exemplary embodiment of the present invention.

FIG. 5 illustrates three segment sequences when the existing frequency reuse factor of "3," the first type of segment use scheme, and the omni-directional cell structure are used. More particularly, FIG. 5 illustrates segment sequences allocated to the respective cells when the existing frequency reuse factor of "3" is used in a multi-cell communication system, that is, when the cells are constructed based on cell C0, cell C1, and cell C2, as an example. A segment sequence allocated to cell C0 is entitled segment sequence C0, a segment sequence allocated to cell C1 is entitled segment sequence C1, and a segment sequence allocated to cell C2 is entitled segment sequence C2. The segment sequence C0, the segment sequence C1, and the segment sequence C2 are as follows.

Segment Sequence C0: Segment A→Segment B→Segment C

Segment Sequence C1: Segment B→Segment C→Segment A

Segment Sequence C2: Segment C→Segment A→Segment B

Figure 6:
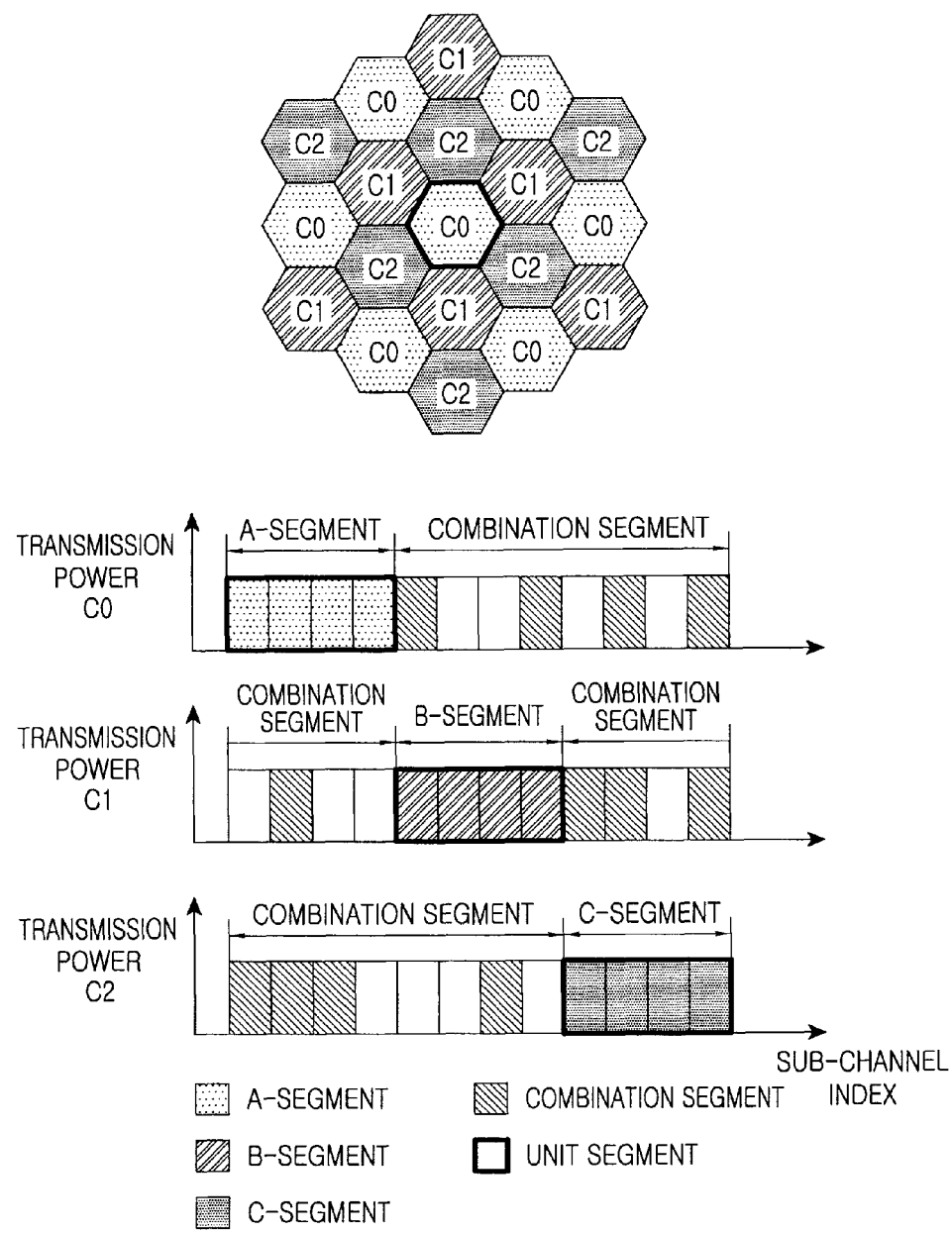
FIG. 6 is a view illustrating an IFR scheme when an existing frequency reuse factor of "3," the second type of segment use scheme, and the omni-directional cell structure are used according to an exemplary embodiment of the present invention.

FIG. 6 is a view illustrating an IFR scheme when an existing frequency reuse factor of "3," the second type of segment use scheme, and the omni-directional cell structure are used according to an exemplary embodiment of the present invention.

FIG. 6 illustrates three segment sequences when the existing frequency reuse factor of "3," the second type of segment use scheme, and the omni-directional cell structure are used. More particularly, FIG. 6 illustrates segment sequences allocated to the respective cells when the existing frequency reuse factor of "3" is used in a multi-cell communication system, that is, when the cells are constructed based on cell C0, cell C1, and cell C2, as an example. A segment sequence allocated to cell C0 is entitled segment sequence C0, a segment sequence allocated to cell C1 is entitled segment sequence C1, and a segment sequence allocated to cell C2 is entitled segment sequence C2. The segment sequence C0, the segment sequence C1, and the segment sequence C2 are as follows.

Segment Sequence C0: Segment A→Combination Segment constituted by Segments B and C Segment Sequence C1: Segment B→Combination Segment constituted by Segments C and A Segment Sequence C2: Segment C→Combination Segment constituted by Segments A and B Here, a combination segment denotes a segment in which the entire or a part of remaining segments, except for a base segment, among segments used in each cell, are combined. FIG. 6 illustrates a case where each combination segment is configured by combining the entire remaining segments, except for a base segment, among segments used in each cell.

Figure 7:
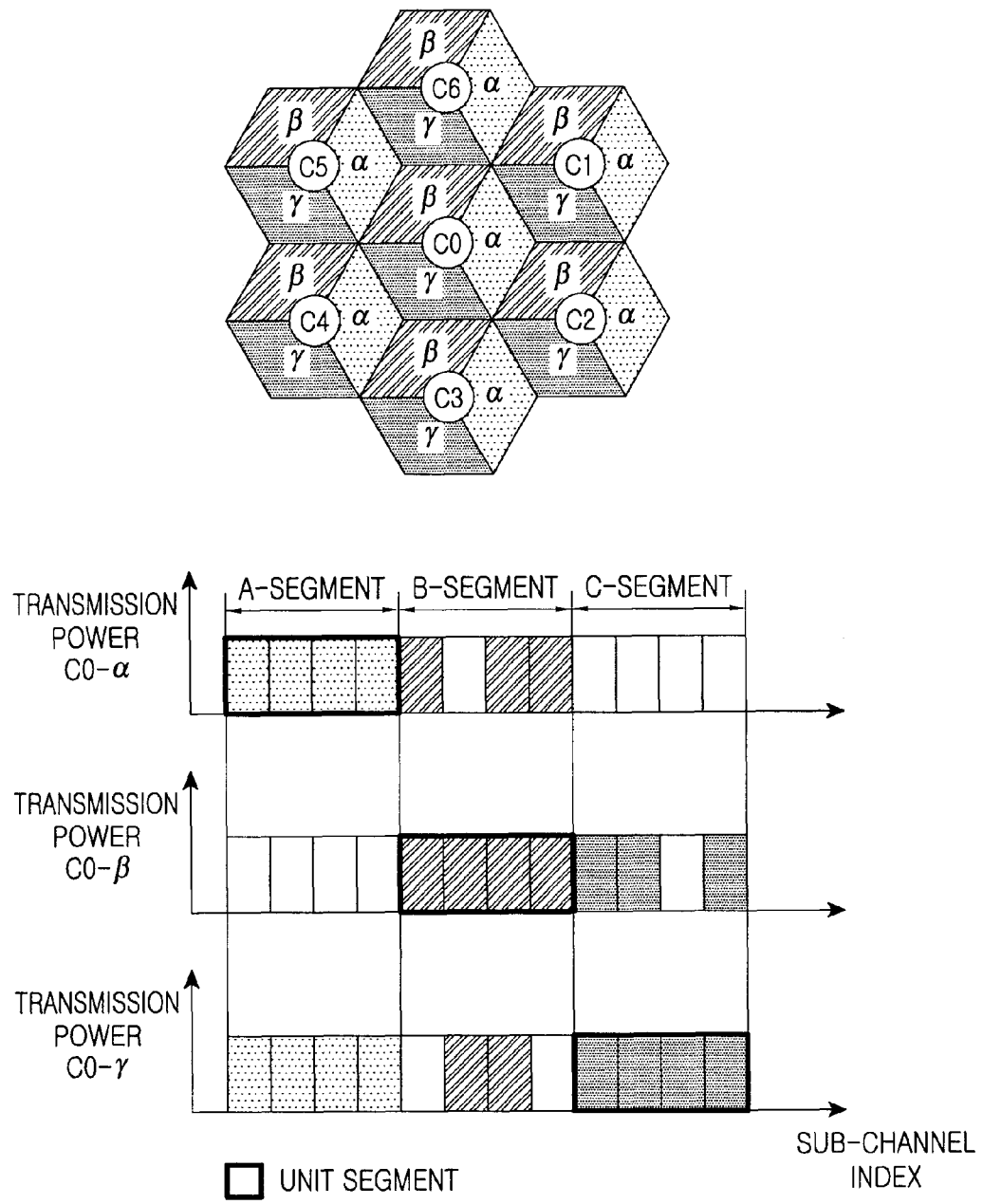
FIG. 7 is a view illustrating an IFR scheme when an existing frequency reuse factor of "3," the first type of segment use scheme, and a sectored cell structure are used according to an exemplary embodiment of the present invention.

FIG. 7 is a view illustrating an IFR scheme when an existing frequency reuse factor of "3," the first type of segment use scheme, and a sectored cell structure are used according to an exemplary embodiment of the present invention.

FIG. 7 illustrates three segment sequences when the existing frequency reuse factor of "3," the first type of segment use scheme, and the sectored cell structure are used.

More particularly, FIG. 7 illustrates segment sequences allocated to the respective sectors of cell C0, which is a cell included in a multi-cell communication system, when each cell in the multi-cell communication system includes three sectors, i.e., sector α, sector β, and sector γ, as an example. A segment sequence allocated to sector α of cell C0 is entitled segment sequence C0-α, a segment sequence allocated to sector β of cell C0 is entitled segment sequence C0-β, and a segment sequence allocated to sector γ of cell C0 is entitled segment sequence C0-γ. The segment sequence C0-α, the segment sequence C0-β, and the segment sequence C0-γ are as follows.

Segment Sequence C0-α: Segment A→Segment B→Segment C

Segment Sequence C0-β: Segment B→Segment C→Segment A

Segment Sequence C0-γ: Segment C→Segment A→Segment B

Figure 8:
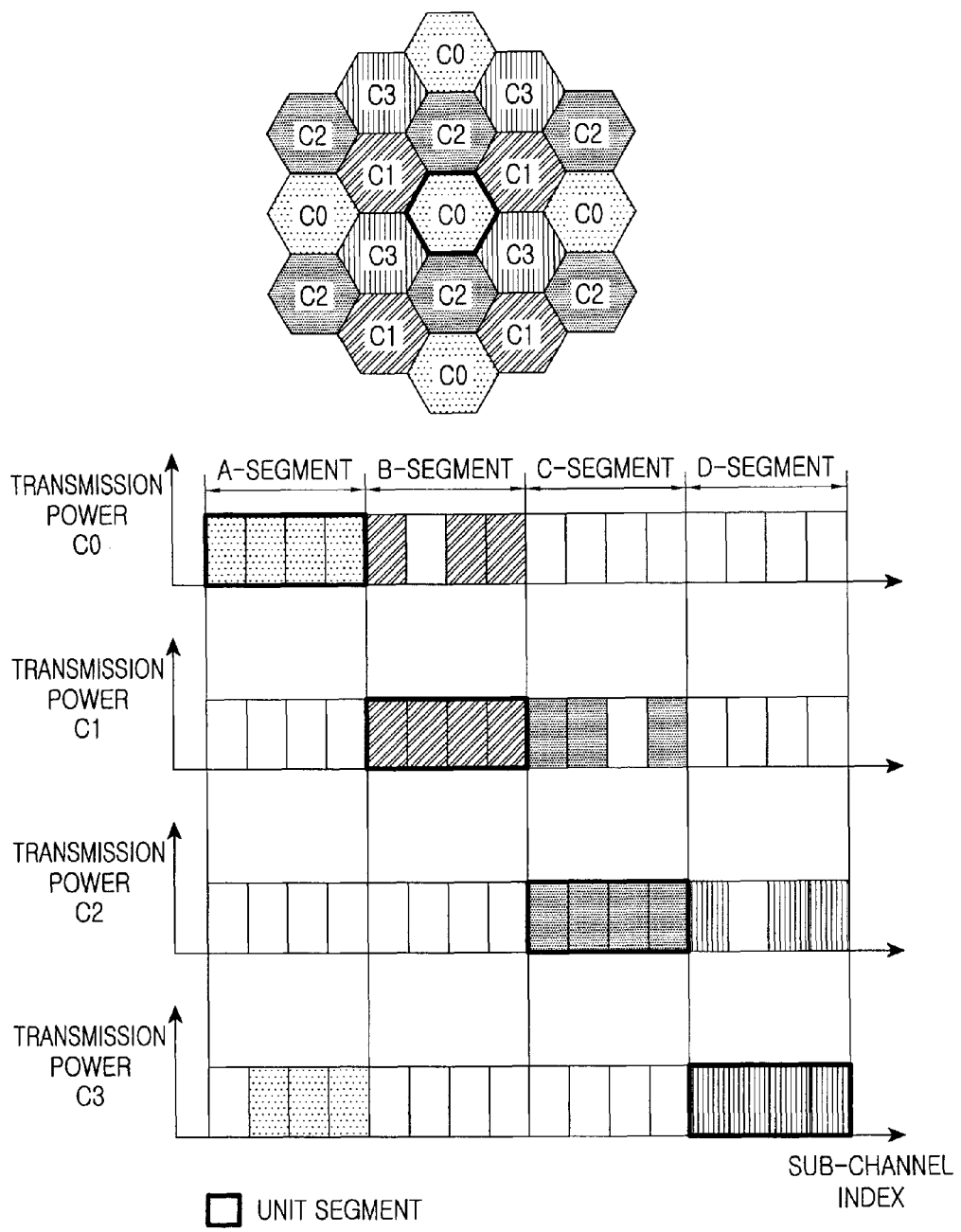
FIG. 8 is a view illustrating an IFR scheme when an existing frequency reuse factor of "4," the first type of segment use scheme, and the omni-directional cell structure are used according to an exemplary embodiment of the present invention.

FIG. 8 is a view illustrating an IFR scheme when an existing frequency reuse factor of "4," the first type of segment use scheme, and the omni-directional cell structure are used according to an exemplary embodiment of the present invention.

FIG. 8 illustrates four segment sequences when the existing frequency reuse factor of "4," the first type of segment use scheme, and the omni-directional cell structure are used. More particularly, FIG. 8 illustrates segment sequences allocated to the respective cells when the existing frequency reuse factor of "4" is used in a multi-cell communication system, that is, when the cells are constructed based on cell C0, cell C1, cell C2, and cell C3, as an example. A segment sequence allocated to cell C0 is entitled segment sequence C0, a segment sequence allocated to cell C1 is entitled segment sequence C1, a segment sequence allocated to cell C2 is entitled segment sequence C2, and a segment sequence allocated to cell C3 is entitled segment sequence C3. The segment sequence C0, the segment sequence C1, the segment sequence C2, and the segment sequence C3 are as follows.

Segment Sequence C0: Segment A→Segment B→Segment C→Segment D

Segment Sequence C1: Segment B→Segment C→Segment D→Segment A

Segment Sequence C2: Segment C→Segment D→Segment A→Segment B

Segment Sequence C3: Segment D→Segment A→Segment B→Segment C

Figure 9:
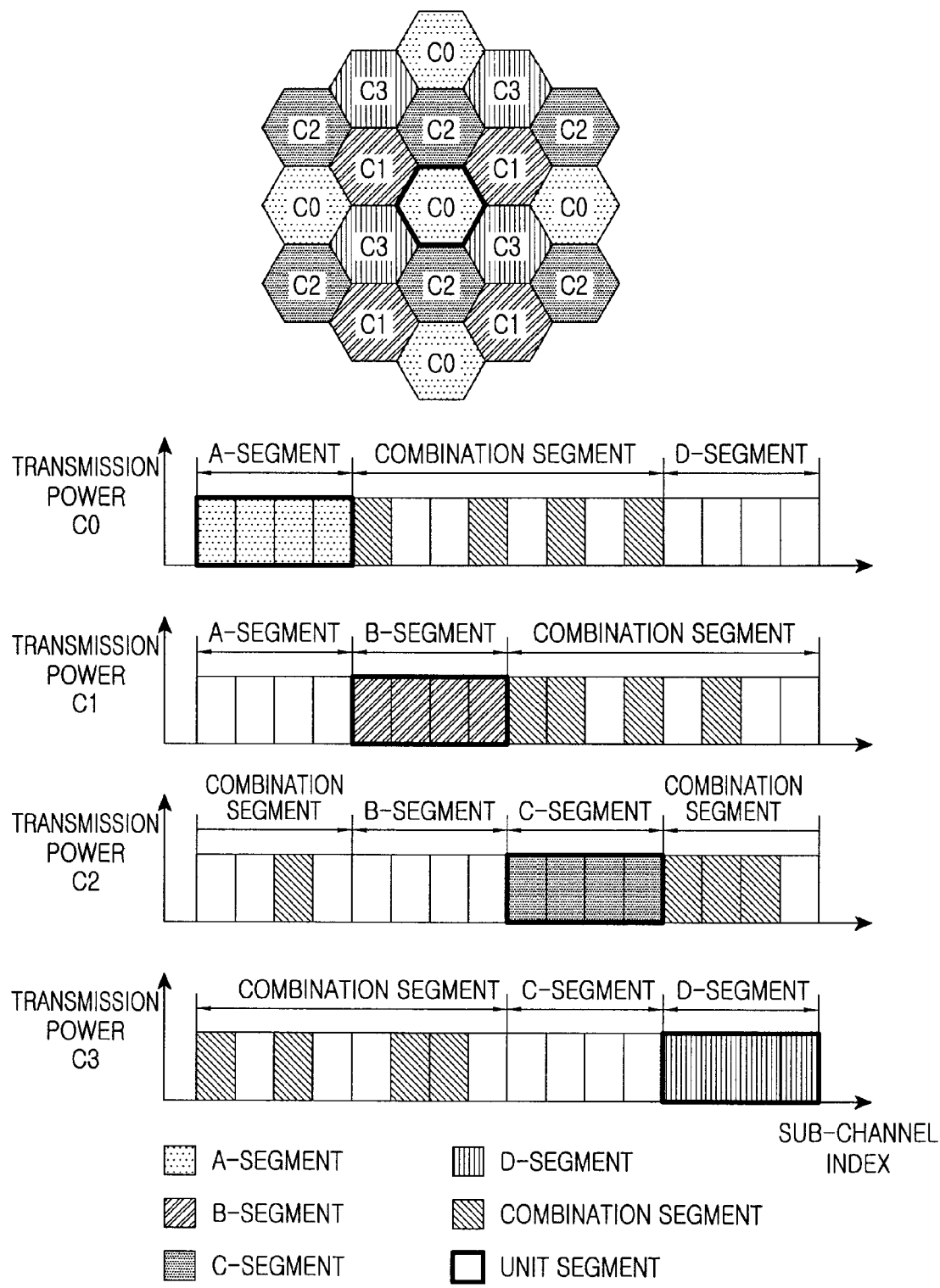
FIG. 9 is a view illustrating a first example of an IFR scheme when an existing frequency reuse factor of "4," the second type of segment use scheme, and the omni-directional cell structure are used according to an exemplary embodiment of the present invention.

FIG. 9 is a view illustrating a first example of an IFR scheme when an existing frequency reuse factor of "4," the second type of segment use scheme, and the omni-directional cell structure are used according to an exemplary embodiment of the present invention.

FIG. 9 illustrates four segment sequences when the existing frequency reuse factor of "4," the second type of segment use scheme, and the omni-directional cell structure are used. More particularly, FIG. 9 illustrates segment sequences allocated to the respective cells when the existing frequency reuse factor of "4" is used in a multi-cell communication system, that is, when the cells are constructed based on cell C0, cell C1, cell C2, and cell C3, as an example. A segment sequence allocated to cell C0 is entitled segment sequence C0, a segment sequence allocated to cell C1 is entitled segment sequence C1, a segment sequence allocated to cell C2 is entitled segment sequence C2, and a segment sequence allocated to cell C3 is entitled segment sequence C3. The segment sequence C0, the segment sequence C1, the segment sequence C2, and the segment sequence C3 are as follows.

Segment Sequence C0: Segment A→Combination Segment constituted by Segments B and C→Segment D Segment Sequence C1: Segment B→Combination Segment constituted by Segments C and D→Segment A Segment Sequence C2: Segment C→Combination Segment constituted by Segments D and A→Segment B Segment Sequence C3: Segment D→Combination Segment constituted by Segments A and B→Segment C FIG. 9 illustrates a case where each combination segment is configured by combining a part of remaining segments, except for a base segment, among segments used in each cell.

Figure 10:
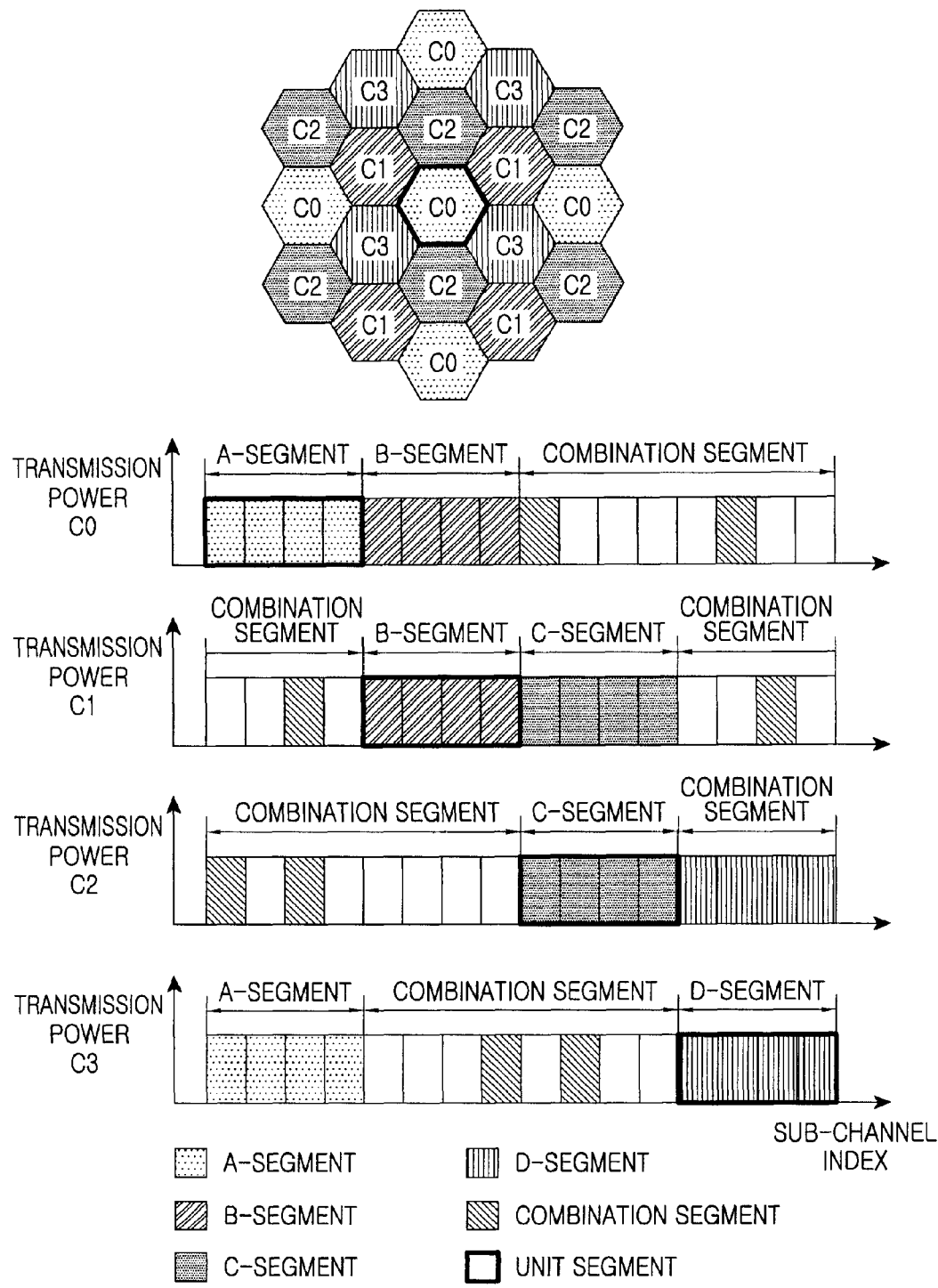
FIG. 10 is a view illustrating a second example of the IFR scheme when an existing frequency reuse factor of "4," the second type of segment use scheme, and the omni-directional cell structure are used according to an exemplary embodiment of the present invention.

FIG. 10 is a view illustrating a second example of the IFR scheme when an existing frequency reuse factor of "4," the second type of segment use scheme, and the omni-directional cell structure are used according to an exemplary embodiment of the present invention.

FIG. 10 illustrates four segment sequences when the existing frequency reuse factor of "4," the second type of segment use scheme, and the omni-directional cell structure are used. More particularly, FIG. 10 illustrates segment sequences allocated to the respective cells when the existing frequency reuse factor of "4" is used in a multi-cell communication system, that is, when the cells are constructed based on cell C0, cell C1, cell C2, and cell C3, as an example. A segment sequence allocated to cell C0 is entitled segment sequence C0, a segment sequence allocated to cell C1 is entitled segment sequence C1, a segment sequence allocated to cell C2 is entitled segment sequence C2, and a segment sequence allocated to cell C3 is entitled segment sequence C3. The segment sequence C0, the segment sequence C1, the segment sequence C2, and the segment sequence C3 are as follows.

Segment Sequence C0: Segment A→Segment B→Combination Segment constituted by Segments C and D Segment Sequence C1: Segment B→Segment C→Combination Segment constituted by Segments D and A Segment Sequence C2: Segment C→Segment D→Combination Segment constituted by Segments A and B Segment Sequence C3: Segment D→Segment A→Combination Segment constituted by Segments B and C FIG. 11 is a view illustrating a third example of the IFR scheme when an existing frequency reuse factor of "4," the second type of segment use scheme, and the omni-directional cell structure are used according to an exemplary embodiment of the present invention.

Figure 11:
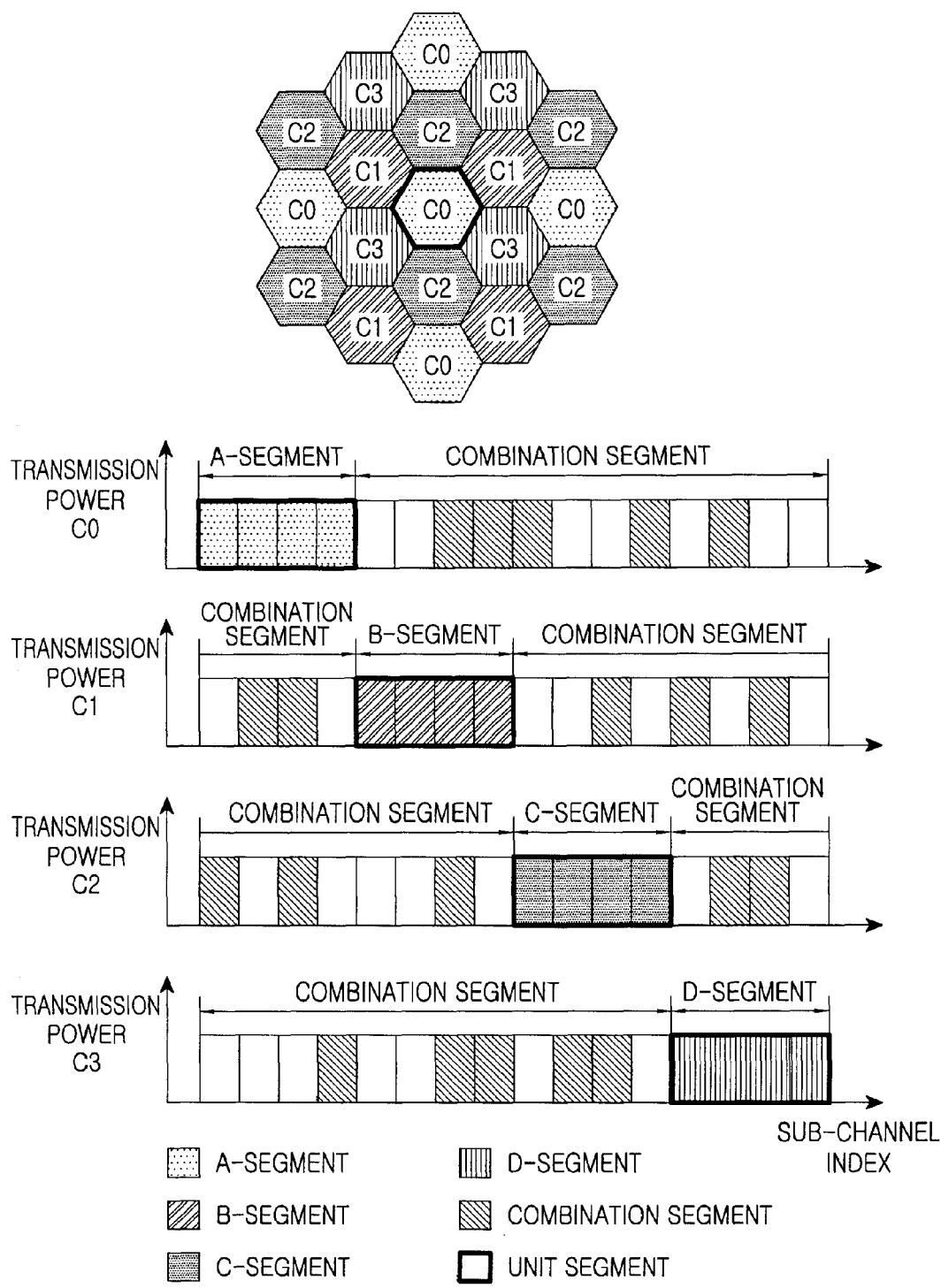
FIG. 11 is a view illustrating a third example of the IFR scheme when an existing frequency reuse factor of "4," the second type of segment use scheme, and the omni-directional cell structure are used according to an exemplary embodiment of the present invention.

FIG. 11 illustrates four segment sequences when the existing frequency reuse factor of "4," the second type of segment use scheme, and the omni-directional cell structure are used. More particularly, FIG. 11 illustrates segment sequences allocated to the respective cells when the existing frequency reuse factor of "4" is used in a multi-cell communication system, that is, when the cells are constructed based on cell C0, cell C1, cell C2, and cell C3, as an example. A segment sequence allocated to cell C0 is entitled segment sequence C0, a segment sequence allocated to cell C1 is entitled segment sequence C1, a segment sequence allocated to cell C2 is entitled segment sequence C2, and a segment sequence allocated to cell C3 is entitled segment sequence C3. The segment sequence C0, the segment sequence C1, the segment sequence C2, and the segment sequence C3 are as follows.

Segment Sequence C0: Segment A→Combination Segment constituted by Segments B, C, and D Segment Sequence C1: Segment B→Combination Segment constituted by Segments C, D and A Segment Sequence C2: Segment C→Combination Segment constituted by Segments D, A, and B Segment Sequence C3: Segment D→Combination Segment constituted by Segments A, B, and C FIG. 12 is a view illustrating an IFR scheme when an existing frequency reuse factor of "4," the first type of segment use scheme, and the sectored cell structure are used according to an exemplary embodiment of the present invention.

Figure 12:
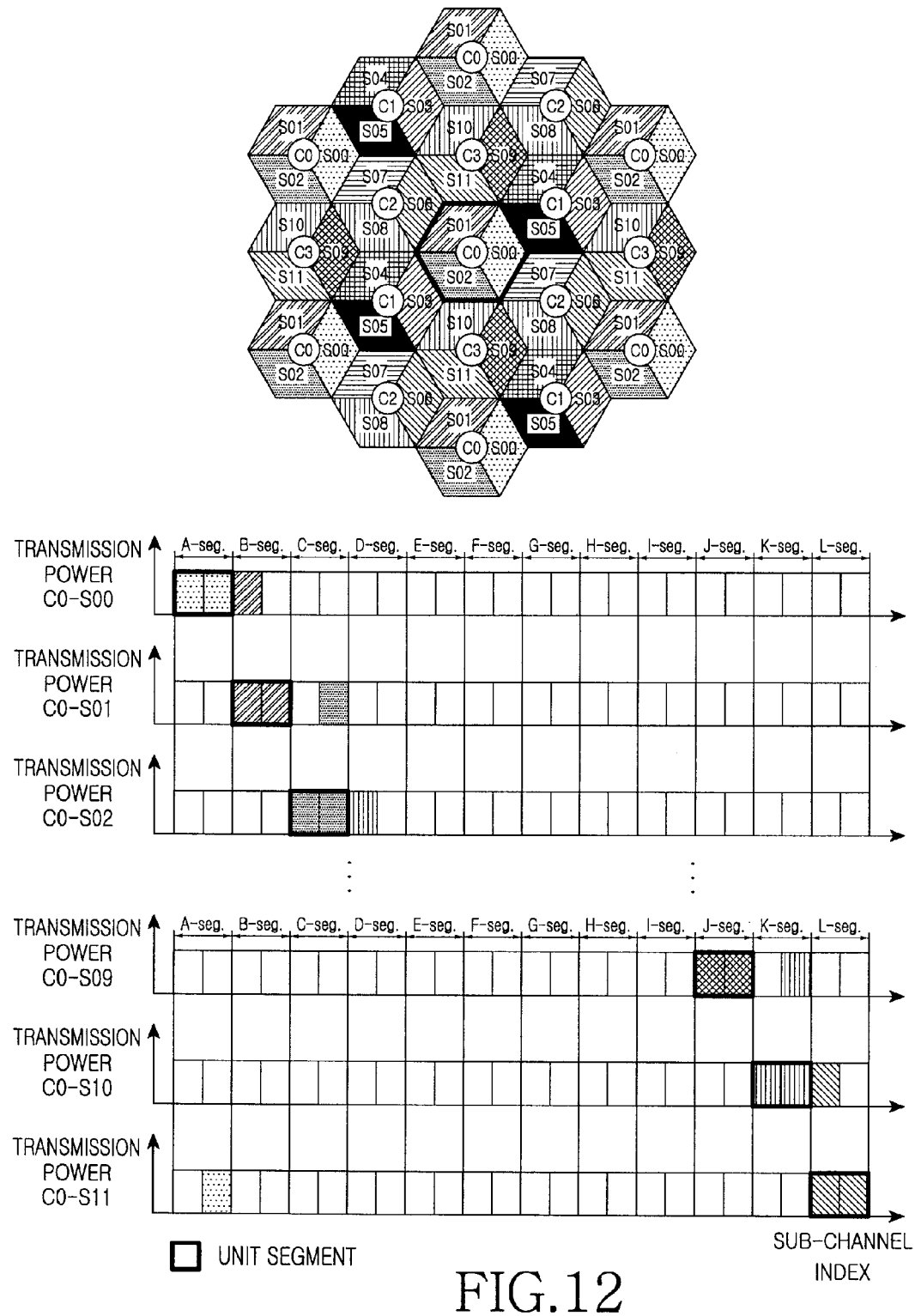
FIG. 12 is a view illustrating an IFR scheme when an existing frequency reuse factor of "4," the first type of segment use scheme, and the sectored cell structure are used according to an exemplary embodiment of the present invention.

FIG. 12 illustrates twelve segment sequences when the existing frequency reuse factor of "4," the first type of segment use scheme, and the sectored cell structure are used.

More particularly, FIG. 12 illustrates segment sequences allocated to the respective sectors of each of cell C0, cell C1, cell C2, and cell C3, which are included in a multi-cell communication system, when each cell includes three sectors, i.e., sector α, sector β, and sector γ, as an example. A segment sequence allocated to sector α of cell C0 is entitled segment sequence C0-S00, a segment sequence allocated to sector β of cell C0 is entitled segment sequence C0-S01, a segment sequence allocated to sector γ of cell C0 is entitled segment sequence C0-S02, a segment sequence allocated to sector α of cell C1 is entitled segment sequence C1-S03, a segment sequence allocated to sector β of cell C1 is entitled segment sequence C1-S04, a segment sequence allocated to sector γ of cell C1 is entitled segment sequence C1-S05, a segment sequence allocated to sector α of cell C2 is entitled segment sequence C2-S06, a segment sequence allocated to sector β of cell C2 is entitled segment sequence C2-S07, a segment sequence allocated to sector γ of cell C2 is entitled segment sequence C2-S08, a segment sequence allocated to sector α of cell C3 is entitled segment sequence C3-S09, a segment sequence allocated to sector β of cell C3 is entitled segment sequence C3-S10, and a segment sequence allocated to sector γ of cell C3 is entitled segment sequence C3-S11. The segment sequence C0-S00, the segment sequence C0-S01, the segment sequence C0-S02, the segment sequence C1-S03, the segment sequence C1-S04, the segment sequence C1-S05, the segment sequence C2-S06, the segment sequence C2-S07, the segment sequence C2-S08, the segment sequence C3-S09, the segment sequence C3-S10, and the segment sequence C3-S11 are as follows.

Segment Sequence C0-S00: Segment A→Segment B→Segment C→Segment D→Segment E→Segment F→Segment G→Segment H→Segment I→Segment J→Segment K→Segment L Segment Sequence C0-S01: Segment B→Segment C→Segment D→Segment E→Segment F→Segment G→Segment H→Segment I→Segment J→Segment K→Segment L→Segment A Segment Sequence C0-S02: Segment C→Segment D→Segment E→Segment F→Segment G→Segment H→Segment I→Segment J→Segment K→Segment L→Segment A→Segment B Segment Sequence C1-S03: Segment D→Segment E→Segment F→Segment G→Segment H→Segment I→Segment J→Segment K→Segment L→Segment A→Segment B→Segment C Segment Sequence C1-S04: Segment E→Segment F→Segment G→Segment H→Segment I→Segment J→Segment K→Segment L→Segment A→Segment B→Segment C→Segment D Segment Sequence C1-S05: Segment F→Segment G→Segment H→Segment I→Segment J→Segment K→Segment L→Segment A→Segment B→Segment C→Segment D→Segment E Segment Sequence C2-S06: Segment G→Segment H→Segment I→Segment J→Segment K→Segment L→Segment A→Segment B→Segment C→Segment D→Segment E→Segment F Segment Sequence C2-S07: Segment H→Segment I→Segment J→Segment K→Segment L→Segment A→Segment B→Segment C→Segment D→Segment E→Segment F→Segment G Segment Sequence C2-S08: Segment I→Segment J→Segment K→Segment L→Segment A→Segment B→Segment C→Segment D→Segment E→Segment F→Segment G→Segment H Segment Sequence C3-S09: Segment J→Segment K→Segment L→Segment A→Segment B→Segment C→Segment D→Segment E→Segment F→Segment G→Segment H→Segment I Segment Sequence C3-S10: Segment K→Segment L→Segment A→Segment B→Segment C→Segment D→Segment E→Segment F→Segment G→Segment H→Segment I→Segment J Segment Sequence C3-S11: Segment L→Segment A→Segment B→Segment C→Segment D→Segment E→Segment F→Segment G→Segment H→Segment I→Segment J→Segment K FIG. 13 is a view illustrating an IFR scheme when an existing frequency reuse factor of "7," the first type of segment use scheme, and the omni-directional cell structure are used according to an exemplary embodiment of the present invention.

Figure 13:
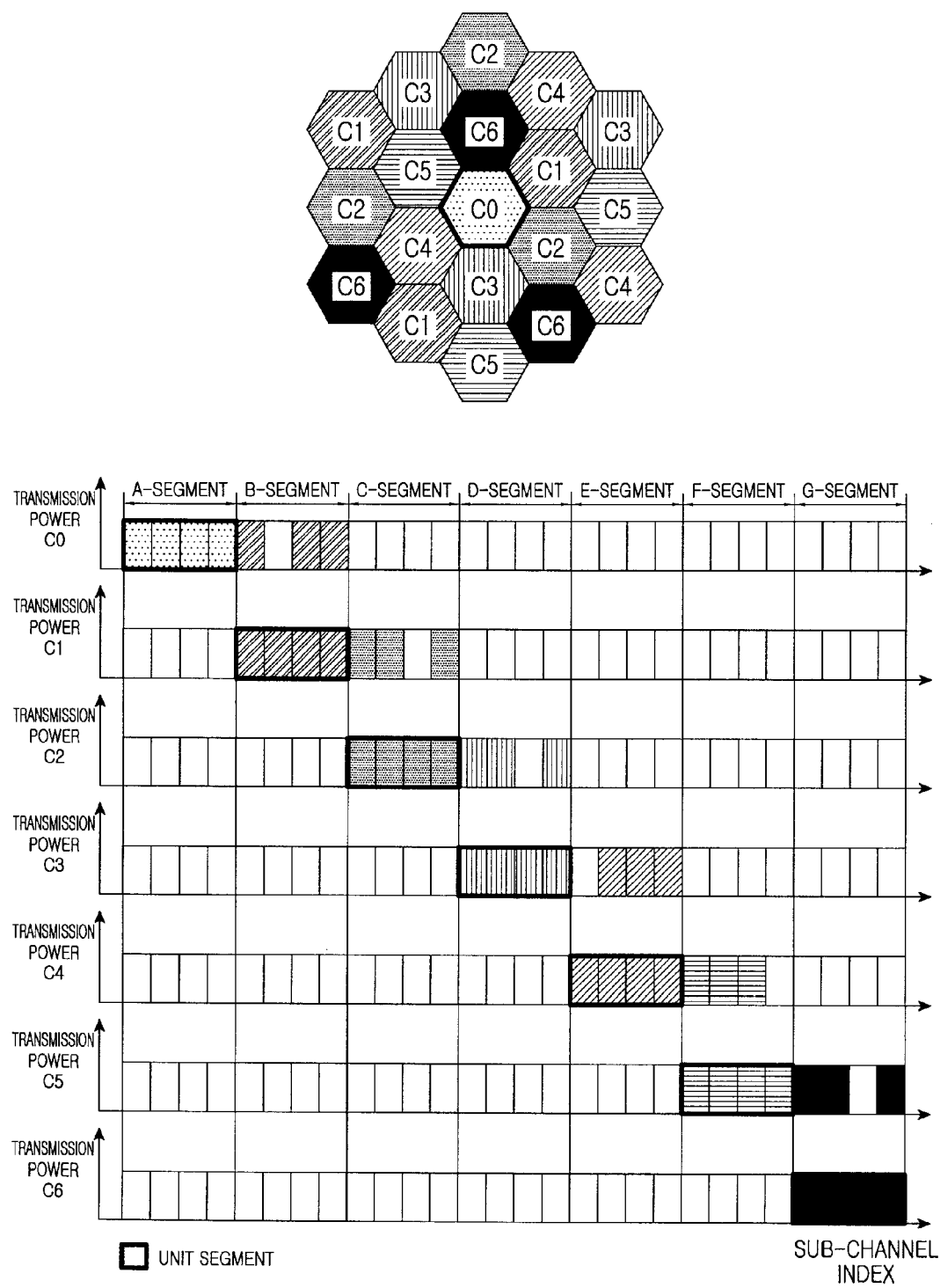
FIG. 13 is a view illustrating an IFR scheme when an existing frequency reuse factor of "7," the first type of segment use scheme, and the omni-directional cell structure are used according to an exemplary embodiment of the present invention.

FIG. 13 illustrates seven segment sequences when the existing frequency reuse factor of "7," the first type of segment use scheme, and the omni-directional cell structure are used. More particularly, FIG. 13 illustrates segment sequences allocated to the respective cells when the existing frequency reuse factor of "7" is used in a multi-cell communication system, that is, when the cells are constructed based on cell C0, cell C1, cell C2, cell C3, cell C4, cell C5, and cell C6, as an example. A segment sequence allocated to cell C0 is entitled segment sequence C0, a segment sequence allocated to cell C1 is entitled segment sequence C1, a segment sequence allocated to cell C2 is entitled segment sequence C2, a segment sequence allocated to cell C3 is entitled segment sequence C3, a segment sequence allocated to cell C4 is entitled segment sequence C4, a segment sequence allocated to cell C5 is entitled segment sequence C5, and a segment sequence allocated to cell C6 is entitled segment sequence C6. The segment sequence C0, the segment sequence C1, the segment sequence C2, the segment sequence C3, the segment sequence C4, the segment sequence C5, and the segment sequence C6 are as follows.

Segment Sequence C0: Segment A→Segment B→Segment C→Segment D→Segment E→Segment F→Segment G Segment Sequence C1: Segment B→Segment C→Segment D→Segment E→Segment F→Segment G→Segment A Segment Sequence C2: Segment C→Segment D→Segment E→Segment F→Segment G→Segment A→Segment B Segment Sequence C3: Segment D→Segment E→Segment F→Segment G→Segment A→Segment B→Segment C Segment Sequence C4: Segment E→Segment F→Segment G→Segment A→Segment B→Segment C→Segment D Segment Sequence C5: Segment F→Segment G→Segment A→Segment B→Segment C→Segment D→Segment E Segment Sequence C6: Segment G→Segment A→Segment B→Segment C→Segment D→Segment E→Segment F According to the above exemplary embodiments of the present invention, the entire frequency band is divided into a preset number of partial bands, and then the order in which each cell uses resources of partial bands is systematically controlled, so that it is possible to reduce Inter-Cell Interference (ICI).

The following description will be given about a method for providing a higher average performance than conventional frequency reuse schemes, and ensuring a Signal to Interference plus Noise Ratio (SINR) required for users located in a cell boundary region, where the signal characteristics are poor by systematically controlling ICI through a sequential resource use.

First, there are provided a partial band use sequence and a partial band use method in which elements according to resource use, such as distribution characteristics of users, an interference matter according resource allocation, a frequency loading factor of a center cell, etc. are reflected. In the following description, a loading factor denotes a frequency loading factor. In addition, in the following description, a loading factor denotes a ratio of a frequency band allocated to a current user to the entire allocated frequency band.

First, according to exemplary embodiments of the present invention, the entire frequency band is divided into a preset number of partial bands, and a part of the divided partial bands is defined as a quasi-orthogonal fundamental band, which does not cause interference with adjacent cells at a reference loading factor or less, which will now be described with reference to FIG. 14.

FIG. 14 is a view illustrating a quasi-orthogonal fundamental band according to an exemplary embodiment of the present invention.

In order to systematically control interference between cells in a multi-cell communication system, each cell uses partial bands according to a preset sequence, wherein the resource allocation is performed with allocated partial bands until the resources within the allocated partial bands have been totally exhausted. In this case, a quasi-orthogonal fundamental band corresponds to a band first allocated as a resource in each cell. At a preset loading factor or less, quasi-orthogonal fundamental bands do not cause interference with adjacent cells, so that interference between adjacent cells can be always kept low.

Referring to FIG. 14, the entire available frequency band is divided into six partial bands 10 to 60. A resource use sequence of partial bands, i.e. a segment sequence, of each cell C1, C2, and C3 has been determined. For example, a second partial band 20 is first allocated in cell C1. Also, a fourth partial band 40 and a sixth partial band 60 are first allocated in cells C2 and C3, respectively. Therefore, the second partial band 20, the fourth partial band 40, and the sixth partial band 60 correspond to quasi-orthogonal fundamental bands of cells C1, C2, and C3, respectively.

When such a quasi-orthogonal fundamental band is allocated, a dynamic channel allocation (DCA) taking into consideration an SINR of a user and/or a high signal quality requested by the user may be performed. For example, a quasi-orthogonal fundamental band causing relatively low ICI may be allocated preferentially to users located in a cell boundary region, where the SINR is low, thereby enabling a reduction of ICI.

Hereinafter, an exemplary embodiment of the present invention will be described.

Figure 15:
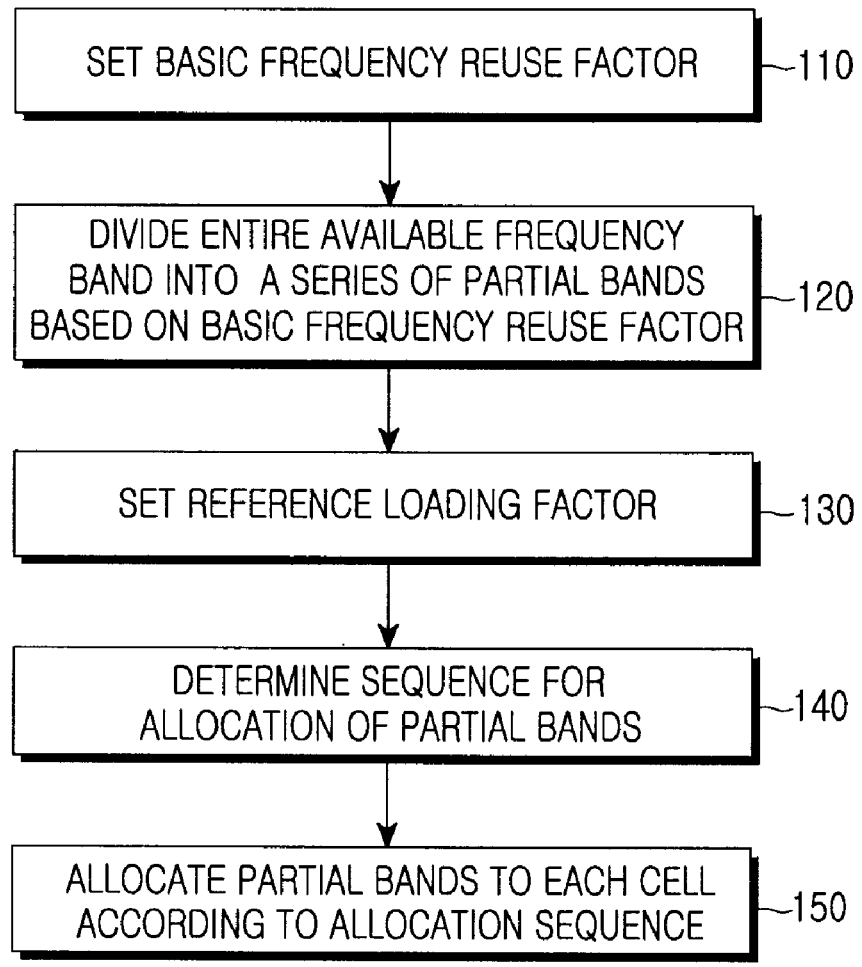
FIG. 15 is a flowchart illustrating a frequency resource use method according to an exemplary embodiment of the present invention.

FIG. 15 is a flowchart illustrating a frequency resource use method according to an exemplary embodiment of the present invention. In an exemplary implementation, such a frequency resource use method is performed by a base station controlling wireless resource allocation for cells.

Referring to FIG. 15, a base station establishes a basic frequency reuse factor in step 110. In this case, the established basic frequency reuse factor is used as a reference for band division. In step 120, the base station divides the entire available frequency band into a series of partial bands based on the basic frequency reuse factor.

For example, the entire available frequency band may be divided into partial bands, the number of which corresponds to an integer multiplied by the basic frequency reuse factor. The following description will be given about a case where the entire available frequency band is divided into partial bands, the number of which corresponds to two times the basic frequency reuse factor, as an example. In this case, when the basic frequency reuse factor has a value of "3," the entire available frequency band is divided into six partial bands, and when the basic frequency reuse factor has a value of "4," the entire available frequency band is divided into eight partial bands.

Meanwhile, as the number of divided bands increases, it is possible to achieve a more systematic interference control from an interfering cell layer far away from a center cell. Therefore, as the basic frequency reuse factor has a higher value, a distance from a center cell to an interfering cell, which is influenced by the center cell, becomes longer. That is, the basic frequency reuse factor determines a range of cells, to which a center cell causes interference, upon a first partial band allocation. Hereinafter, the term "Tier-#" refers to the number of cells corresponding to a distance spaced from the center cell. For example, Tier-1 refers to first cells surrounding the center cell, and Tier-2 refers to second cells surrounding the first cells.

For example, upon a design based on a frequency reuse factor of "3," the center cell may use resources in such a manner as to cause interference only to Tier-2 cells first, and to expand interfering cells to Tier-1 cells as the loading factor increases. However, upon a design based on a frequency reuse factor of "7," interference is caused first only to Tier-3 cells, and then interference is caused in a sequence of Tier-2 cells and Tier-1 cells as a loading factor increases.

In step 130, the base station establishes a reference loading factor. When all cells operate at the reference loading factor or less, the quasi-orthogonal fundamental bands have the same ICI characteristics as a system having a basic frequency reuse factor.

The reference loading factor is set to a different value depending on whether all partial bands have the same size or partial bands divided according to the size of a quasi-orthogonal fundamental band have difference sizes.

(1) When All Partial Bands Have the Same Size

When a band is divided into partial bands of an integer times a basic frequency reuse factor, the reference loading factor may be defined by equation 1.

$$\text{Reference Loading Factor} = \frac{FRF + 1}{M \times FRF} \quad (1)$$

$$\begin{cases} FRF = i^2 + i \cdot j + j^2 \\ M = 2, 3, 4, \ldots \\ i, j = 1, 2, 3, \ldots \end{cases}$$

In equation 1, "M" functions as a reference for division into a plurality of bands, and is defined as an integer of two or more. For example, in the case of "M=2," a basic frequency reuse factor of 3 produces a reference loading factor of $2/3$, a basic frequency reuse factor of 4 produces a reference loading factor of $5/8$, and a basic frequency reuse factor of 7 produces a reference loading factor of $8/14$. In addition, the "M" functions as a parameter which determines the size of a quasi-orthogonal fundamental band upon a band division.

(2) When the Sizes of Divided Partial Bands are Different Depending on the Size of a Quasi-Orthogonal Fundamental Band The numbers of divided partial bands are the same as "M×FRF," but a quasi-orthogonal fundamental band and normal partial bands have different sizes, so that the reference loading factor is defined by equation 2.

$$\text{Reference Loading Factor} = \quad (2)$$

$$\frac{\text{quasi-orthogonal fundamental band's size} + (M-1) \times FRF \times \text{normal partial band's size}}{\text{entire frequency band's size}}$$

$$\begin{cases} \text{entire frequency band's size} = FRF \times \text{quasi-orthogonal} \\ \text{fundamental band's size} + FRF \times \text{normal partial band's size} \\ FRF = i^2 + i \cdot j + j^2 \\ M = 2, 3, 4, \ldots \\ i, j = 1, 2, 3, \ldots \end{cases}$$

In equation 2, in the case of "M=2," when the size of a quasi-orthogonal fundamental band is twice the size of a normal partial band, a basic frequency reuse factor of 3 produces a reference loading factor of $5/9$, a basic frequency reuse factor of 4 produces a reference loading factor of $2/3$, and a basic frequency reuse factor of 7 produces a reference loading factor of $3/7$.

In step 140, the base station defines a band allocation sequence so that the quasi-orthogonal fundamental band of the center cell cannot cause interference with quasi-orthogonal fundamental bands of adjacent cells at a reference loading factor or less.

The quasi-orthogonal fundamental band corresponds to a partial band first allocated according to each cell. Therefore, the band allocation sequence is established such that the quasi-orthogonal fundamental band is first allocated, and then the other partial bands are allocated.

In step 150, partial bands are allocated to each cell according to the determined allocation sequence.

A partial band allocation sequence when a frequency reuse factor has a value of "3" and a reference loading factor has a value of "$2/3$" will now be described with reference to FIG. 16.

FIG. 16 is a view illustrating ICI of a quasi-orthogonal fundamental band and the remaining normal partial bands when a frequency reuse factor has a value of "3" and a reference loading factor has a value of "$2/3$" according to an exemplary embodiment of the present invention.

FIG. 16 illustrates allocation sequences of partial bands (i.e. first to sixth partial bands) in the respective cells C1, C2, and C3. In cell C1, the second partial band which is first allocated corresponds to a quasi-orthogonal fundamental band. When the partial bands have the same size, the quasi-orthogonal fundamental band does not cause interference with Tier-1 cells on the condition that "reference loading factor≦⅔" according to the aforementioned reference loading factor condition. In other words, the quasi-orthogonal fundamental band does not cause ICI at all until the fourth partial band in the sequence is allocated in the respective cells.

A partial band allocation sequence when a frequency reuse factor has a value of "4" and a reference loading factor has a value of "⅝" will now be described with reference to FIG. 17.

FIG. 17 is a view illustrating ICI of a quasi-orthogonal fundamental band and the remaining normal partial bands when a frequency reuse factor has a value of "4" and a reference loading factor has a value of "⅝" according to an exemplary embodiment of the present invention.

FIG. 17 illustrates allocation sequences of partial bands (i.e. first to eighth partial bands) in the respective cells C1, C2, C3, and C4. In cell C1, the first partial band which is first allocated corresponds to a quasi-orthogonal fundamental band. In cell C2, the third partial band which is first allocated corresponds to a quasi-orthogonal fundamental band. In cell C3, the fifth partial band which is first allocated corresponds to a quasi-orthogonal fundamental band. In cell C4, the seventh partial band which is first allocated corresponds to a quasi-orthogonal fundamental band.

When the partial bands have the same size, the quasi-orthogonal fundamental band does not cause interference with Tier-1 cells on the condition that "reference loading factor (LF)≦⅝" according to the aforementioned reference loading factor condition. In other words, the quasi-orthogonal fundamental band does not cause ICI at all until the fifth partial band in the sequence is allocated in the respective cells.

Since ICI in a quasi-orthogonal fundamental band is satisfied by a basic frequency reuse structure at or below a loading factor corresponding to the basic frequency reuse structure, the quasi-orthogonal fundamental band has an interference structure corresponding to the basic frequency reuse structure. Therefore, when partial bands are used over a maximum of loading factor which can be accommodated by a basic frequency reuse structure, cells to which the center cell causes interference due to the use of additional partial bands increases as illustrated in FIGS. 18A to 18C.

Figure 18:
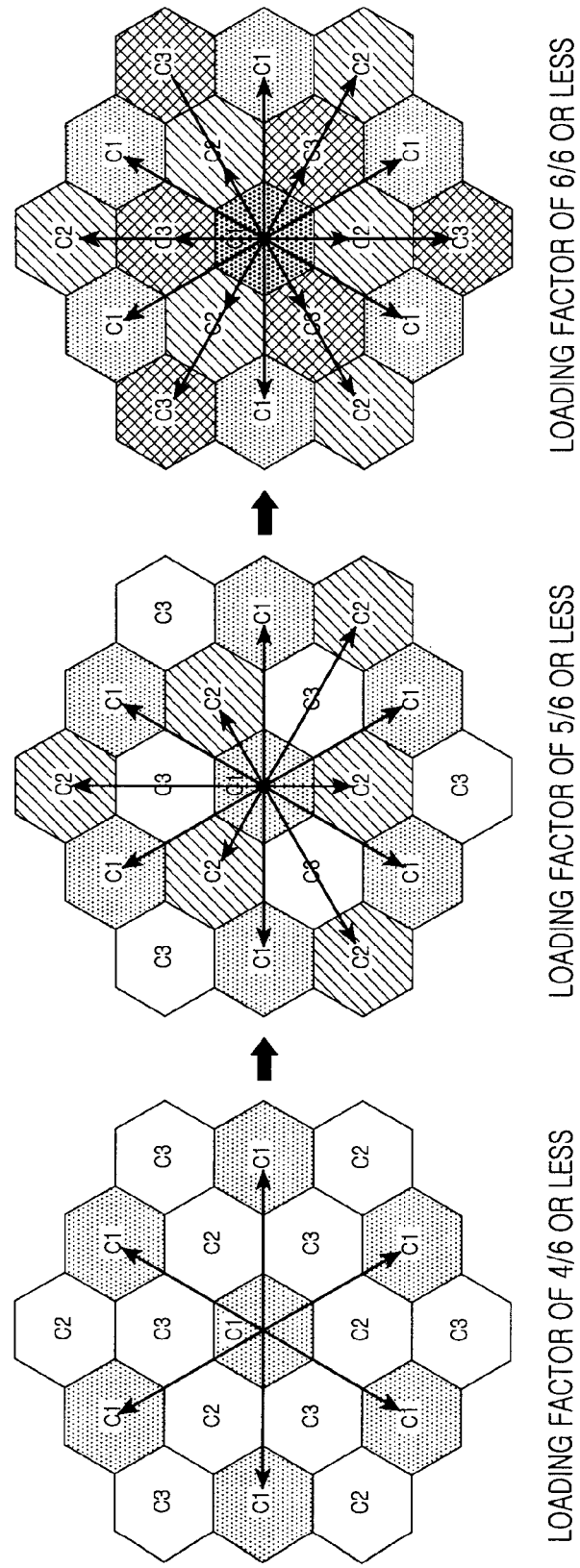
FIGS. 18A to 18C are conceptual views illustrating interfering cells which gradually increase in number according to an increase of a loading factor when the basic frequency reuse factor has a value of "3" and a reference loading factor has a value of 2/3 according to an exemplary embodiment of the present invention.

FIGS. 18A to 18C are conceptual views illustrating interfering cells that gradually increase in number according to an increase of a loading factor when the basic frequency reuse factor has a value of "3" and a reference loading factor has a value of ⅔ according to an exemplary embodiment of the present invention.

For example, in the case of "M=2," when the basic frequency reuse factor has a value of "3," the reference loading factor becomes ⅔. Referring to FIG. 18A, when a loading factor has a value equal to or less than ⅔, ICI is not caused in the quasi-orthogonal fundamental bands of the respective cells (e.g. in the second band of cell C1, the fourth band of cell C2, and the sixth band of cell C3 in FIG. 16).

Referring to FIG. 18B, when a loading factor has a value equal to or less than ⅚, for example, the quasi-orthogonal fundamental band of cell C1 is allocated to cell C2, so that interference with cell C2 is caused in the quasi-orthogonal fundamental band of cell C1. Similarly, referring to FIG. 18C, when a loading factor has a value equal to or less than %, for example, the quasi-orthogonal fundamental band of cell C1 is allocated not only to cell C2, but also to cell C3, so that interference with cells C2 and C3 is caused in the quasi-orthogonal fundamental band of cell C1.

As described above, after a partial band allocation sequence is set, partial bands are allocated to each cell according to the set partial band allocation sequence upon a service request from a user. For example, when a new user in a cell requests a service, the base station allocates a quasi-orthogonal fundamental band preferentially to the new user, wherein an empty sub-channel within the quasi-orthogonal fundamental band may be allocated to the new user.

Also, upon allocating a partial band, an SINR, a signal quality requested by the user, etc. may be taken into consideration.

When the SINR is taken into consideration, the quasi-orthogonal fundamental band may be allocated preferentially to users located in a cell-boundary region, where the SINR is low, because the quasi-orthogonal fundamental band keeps a relatively low ICI. Therefore, in the partial band allocation process, the base station arranges users in a sequence from the lowest SINR to the highest SINR, and allocates the quasi-orthogonal fundamental band preferentially to users located in a region where the SINR is relatively lower. Alternatively, the base station may periodically re-estimate SINRs, and may newly allocate the quasi-orthogonal fundamental band to users located in a region where the SINR is relatively lower according to a result of the re-estimation while allocating normal partial bands to users, who are located in a region where the SINR is relatively higher, and are out of the size of the quasi-orthogonal fundamental band.

When a signal quality requested by the user is taken into consideration, the quasi-orthogonal fundamental band may be allocated preferentially to users for whom a high signal quality may be maintained, or to users for whom a high performance enhancement is additionally required because the quasi-orthogonal fundamental band keeps a relatively lower ICI.

As described above, by taking into consideration the signal qualities requested by users and SINRs in the partial band allocation process, the quasi-orthogonal fundamental band may be allocated preferentially to users requesting higher signal qualities or users located in regions where the SINR is relatively lower.

Hereinafter, the sequence setting method will be described.

According to an exemplary embodiment of the present invention, a band allocation sequence may be roughly designed separately into a sequence for a quasi-orthogonal fundamental band allocation and a sequence for a normal partial band allocation.

Generally, a sequence of quasi-orthogonal fundamental bands has a different length depending on the number of set adjacent cells. When quasi-orthogonal fundamental bands are set between N number of adjacent cells, interference between corresponding bands is not caused at a reference loading factor or less. In this case, the sequence of quasi-orthogonal fundamental bands has a length of "N," and a cyclic sequence where partial bands are shifted one step by one step may be set in order to allocate the quasi-orthogonal fundamental bands to the respective cells.

Example of actual implementation (when a basic frequency reuse factor has a value of "4," that is, when quasi-orthogonal fundamental bands are established between four adjacent cells)

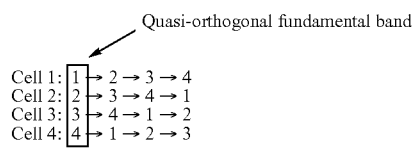

In this case, a partial band first allocated for each cell is set as the quasi-orthogonal fundamental band of the corresponding cell, and the remaining partial bands in a quasi-orthogonal fundamental band sequence are finally allocated after normal partial bands have been allocated because the remaining partial bands cause interference with quasi-orthogonal fundamental bands of adjacent cells.

Meanwhile, a total number of partial bands according to a result of division is an integer times a basic frequency reuse factor. Therefore, when a quasi-orthogonal fundamental band sequence has a length of "N," the number of normal partial bands becomes integer times "N." Since interference between adjacent cells may increase on the average upon allocating normal partial bands, sequences obtained by shifting partial bands one step by one step in a preset allocation sequence may be set for the cells, respectively.

Example of actual implementation (when a basic frequency reuse factor has a value of "4," that is, when there are four normal partial bands)

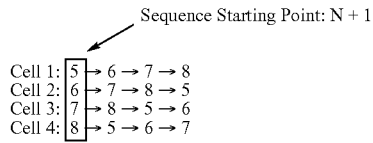

Figure 19:
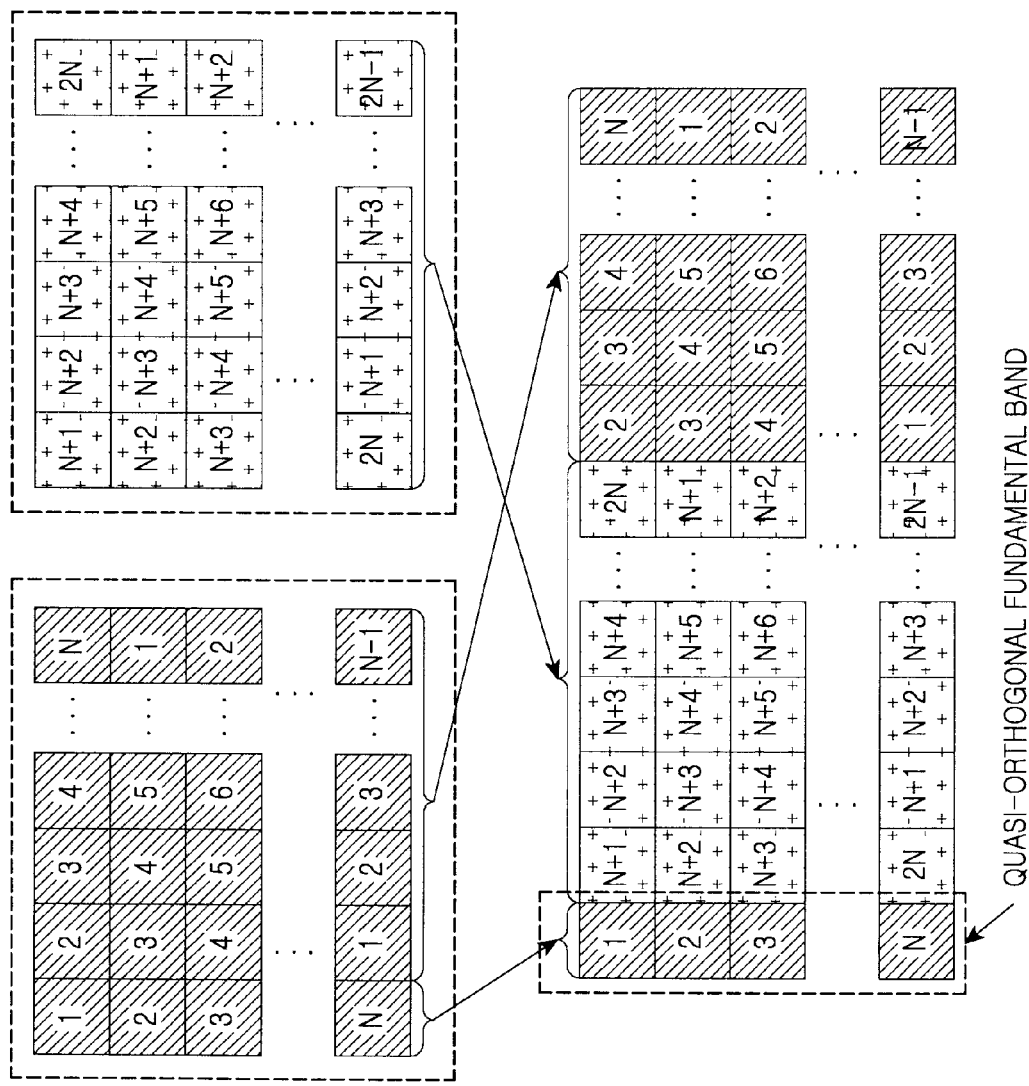
FIG. 19 is a view illustrating a principle of design of the entire sequence for partial band allocation according to an exemplary embodiment of the present invention.

The aforementioned quasi-orthogonal fundamental band allocation sequence and the normal partial band allocation sequence may be combined, and thus the partial band allocation sequence for each cell may be formed as illustrated in FIG. 19.

FIG. 19 is a view illustrating a principle of design of the entire sequence for partial band allocation according to an exemplary embodiment of the present invention.

A first partial band of a quasi-orthogonal fundamental band sequence for each cell is selected as the quasi-orthogonal fundamental band of the corresponding cell. Then, a normal partial band allocation sequence of each cell is connected to the quasi-orthogonal fundamental band of the corresponding cell. Finally, the remaining partial bands, except for the quasi-orthogonal fundamental band, in the quasi-orthogonal fundamental band sequence of each cell are connected to the normal partial band allocation sequence of the corresponding cell.

As described above, according to exemplary embodiments of the present invention, the order of using divided partial bands is controlled, so that a quasi-orthogonal fundamental band capable of minimizing interference to adjacent cells can be formed with a frequency reuse factor maintained at "1". In other words, the quasi-orthogonal fundamental band of a center cell is set not to cause interference with the quasi-orthogonal fundamental bands of adjacent cells at a reference loading factor or less. When such a quasi-orthogonal fundamental band is allocated preferentially to users located in a cell-boundary region where the signal characteristics are poor, it is possible to significantly improve the performances of mobile stations of the users located in the cell-boundary region, thereby improving the performance of the entire system. In addition, since exemplary embodiments of the present invention have a flexible resource use structure based on the frequency reuse factor of "1," the present invention can be implemented in conventional frequency reuse schemes (e.g. FRF=3, 4, 7 . . .) by adjusting the order of using partial bands, and can be implemented in various frequency reuse schemes, such as an SFR, an FFR scheme, etc. by adjusting the allocation order of a part of bands and the relation of interference between cells.

According to exemplary embodiments of the present invention, frequency resources are used based on a segment sequence in a multi-cell communication system, thereby addressing a problem due to ICI. Also, according to exemplary embodiments of the present invention, each cell uses frequency resources based on a segment sequence in a multi-cell communication system, thereby being able to control occurrence of ICI through a relatively simple operation. Also, according to exemplary embodiments of the present invention, a segment sequence is determined by taking various parameters relating to a multi-cell communication system into consideration in the multi-cell communication system, thereby being able to reuse frequency resources according to the circumstances of the multi-cell communication system. In addition, according to exemplary embodiments of the present invention, since each cell uses frequency resources based on a segment sequence in a multi-cell communication system, an operation for use of the frequency resources is relatively simple.

While the present invention has been illustrated and described with reference to certain exemplary embodiments thereof, it will be understood by those skilled in the art that various changes in form and details may be made therein without departing from the spirit and scope of the invention as defined by the appended claims and their equivalents. Accordingly, the scope of the invention is not to be limited by the above embodiments but by the claims and the equivalents thereof.

What is claimed is:

1. A method for using frequency resources in a multi-cell communication system, the method comprising:
   using, by a base station corresponding to each cell included in the multi-cell communication system, frequency resources based on a preset segment sequence;
   dividing each of the available frequency bands into a series of partial bands based on a basic frequency reuse factor;
   setting a reference frequency loading factor by using a basic frequency reuse factor;
   defining a quasi-orthogonal fundamental band, which does not cause interference with adjacent cells at the reference frequency loading factor or less, from among the series of partial bands according to each cell;
   determining an allocation sequence so that the quasi-orthogonal fundamental band is first allocated according to each cell; and
   allocating the partial bands to each cell according to the allocation sequence upon a service request from a user,
   wherein available frequency bands of each cell are equal to each other, each of the available frequency bands is divided into "A" number of segments, each segment is divided into "B" number of partial bands, each partial band is divided into "C" number of channels, and the segment sequence represents an order in which the "A" number of segments are used.

2. The method as claimed in claim 1, wherein sizes of the partial bands are the same in each cell, and sizes of the segments are the same in each cell.

3. The method as claimed in claim 1, wherein, when the "B" corresponds to an integer of two or more, the two or more segments exist in one of physically continuous positions and physically discontinuous positions.

4. The method as claimed in claim 1, wherein, when the "C" corresponds to an integer of two or more, the two or more channels exist in one of physically continuous positions and physically discontinuous positions.

5. The method as claimed in claim 1, wherein the segment sequence is determined by using a frequency reuse factor and a sectorization factor.

6. The method as claimed in claim 1, wherein segments first used by the respective cells are orthogonal to each other between adjacent cells or sectors.

7. The method as claimed in claim 1, wherein, when all the partial bands have an equal size, the reference frequency loading factor is defined by an equation, $$\text{Reference Loading Factor} = \frac{FRF+1}{M \times FRF}$$

$$\begin{cases} FRF = i^2 + i \cdot j + j^2 \\ M = 2, 3, 4, \dots \\ i, j = 1, 2, 3, \dots \end{cases},$$

in which "M" functions as a reference for band division, and is defined as an integer of two or more, and "FRF" denotes a basic frequency reuse factor.

8. The method as claimed in claim 1, wherein, when all the partial bands do not have an equal size, the reference frequency loading factor is defined by an equation, $$\text{Reference Loading Factor} = \frac{\text{quasi-orthogonal fundamental band's size} + (M-1) \times FRF \times \text{normal partial band's size}}{\text{entire frequency band's size}}$$

$$\begin{cases} \text{entire frequency band's size} = FRF \times \text{quasi-orthogonal fundamental band's size} + FRF \times \text{normal partial band's size} \\ FRF = i^2 + i \cdot j + j^2 \\ M = 2, 3, 4, \dots \\ i, j = 1, 2, 3, \dots \end{cases},$$

in which "M" functions as a reference for band division, and is defined as an integer of two or more, and "FRF" denotes a basic frequency reuse factor.

9. The method as claimed in claim 1, wherein the partial bands are allocated to each cell by taking into consideration a signal quality requested by the user or Signal to Interference-plus-Noise Ratios (SINRs) of users.

10. A system for using frequency resources in a multi-cell communication system, the system comprising:
a base station, corresponding to a cell included in the multi-cell communication system, for using frequency resources based on a preset segment sequence,
wherein the base station divides each of the available frequency bands into a series of partial bands based on a basic frequency reuse factor, sets a reference frequency loading factor by using the basic frequency reuse factor, defines a quasi-orthogonal fundamental band, which does not cause interference with adjacent cells at the reference frequency loading factor or less, from among the series of partial bands according to each cell, determines an allocation sequence so that the quasi-orthogonal fundamental band is first allocated according to each cell, and allocates the partial bands to each cell according to the allocation sequence upon a service request from a user, and
wherein available frequency bands of each cell are equal to each other, each of the available frequency bands is divided into "A" number of segments, each segment is divided into "B" number of partial bands, each partial band is divided into "C" number of channels, and the segment sequence represents an order in which the "A" number of segments are used.

11. The system as claimed in claim 10, wherein sizes of the partial bands are the same in each cell, and sizes of the segments are the same in each cell.

12. The system as claimed in claim 10, wherein, when the "B" corresponds to an integer of two or more, the two or more segments exist in one of physically continuous positions and physically discontinuous positions.

13. The system as claimed in claim 10, wherein, when the "C" corresponds to an integer of two or more, the two or more channels exist in one of physically continuous positions and physically discontinuous positions.

14. The system as claimed in claim 10, wherein the segment sequence is determined by using a frequency reuse factor and a sectorization factor.

15. The system as claimed in claim 10, wherein segments first used by the respective cells are orthogonal to each other between adjacent cells or sectors.

16. The system as claimed in claim 10, wherein, when all the partial bands have an equal size, the reference frequency loading factor is defined by an equation, $$\text{Reference Loading Factor} = \frac{FRF+1}{M \times FRF}$$

$$\begin{cases} FRF = i^2 + i \cdot j + j^2 \\ M = 2, 3, 4, \dots \\ i, j = 1, 2, 3, \dots \end{cases},$$

in which "M" functions as a reference for band division, and is defined as an integer of two or more, and "FRF" denotes a basic frequency reuse factor.

17. The system as claimed in claim 10, wherein, when all the partial bands do not have an equal size, the reference frequency loading factor is defined by an equation, $$\text{Reference Loading Factor} = \frac{\text{quasi-orthogonal fundamental band's size} + (M-1) \times FRF \times \text{normal partial band's size}}{\text{entire frequency band's size}}$$

$$\begin{cases} \text{entire frequency band's size} = FRF \times \text{quasi-orthogonal fundamental band's size} + FRF \times \text{normal partial band's size} \\ FRF = i^2 + i \cdot j + j^2 \\ M = 2, 3, 4, \dots \\ i, j = 1, 2, 3, \dots \end{cases},$$

in which "M" functions as a reference for band division, and is defined as an integer of two or more, and "FRF" denotes a basic frequency reuse factor.

18. The system as claimed in claim 10, wherein the base station allocates the partial bands to each cell by taking into consideration a signal quality requested by the user or Signal to Interference-plus-Noise Ratios (SINRs) of users.

* * * * *